US012641033B2

(12) United States Patent
Goyal et al.

(10) Patent No.: US 12,641,033 B2
(45) Date of Patent: May 26, 2026

(54) SHARED SUBEVENTS FOR PROTOCOL DATA UNITS ASSOCIATED WITH DIFFERENT STREAMS

(71) Applicant: QUALCOMM Incorporated, San Diego, CA (US)

(72) Inventors: Giriraj Goyal, Bangalore (IN); Vishal Agarwal, Bangalore (IN); Nitin Raghavendra Kidiyoor, Bangalore (IN)

(73) Assignee: QUALCOMM Incorporated, San Diego, CA (US)

( * ) Notice: Subject to any disclaimer, the term of this patent is extended or adjusted under 35 U.S.C. 154(b) by 73 days.

(21) Appl. No.: 18/834,110

(22) PCT Filed: Jun. 16, 2022

(86) PCT No.: PCT/US2022/072983
§ 371 (c)(1),
(2) Date: Jul. 29, 2024

(87) PCT Pub. No.: WO2023/196023
PCT Pub. Date: Oct. 12, 2023

(65) Prior Publication Data
US 2025/0150406 A1 May 8, 2025

(30) Foreign Application Priority Data
Apr. 4, 2022 (IN) .............................. 202241020281

(51) Int. Cl.
*H04L 47/62* (2022.01)
*H04L 1/1607* (2023.01)
*H04W 40/24* (2009.01)

(52) U.S. Cl.
CPC ........ *H04L 47/6225* (2013.01); *H04L 1/1607* (2013.01); *H04W 40/24* (2013.01)

(58) Field of Classification Search
CPC .. H04L 47/6225; H04L 1/1607; H04W 40/24; H04W 40/00
See application file for complete search history.

(56) References Cited

U.S. PATENT DOCUMENTS

| | | | |
|---|---|---|---|
| 10,849,016 B2* | 11/2020 | Turon | H04L 1/1614 |
| 12,207,317 B2* | 1/2025 | Enbuske | H04W 74/0833 |
| 2013/0132603 A1 | 5/2013 | Cohen et al. | |
| 2015/0043341 A1 | 2/2015 | Wong et al. | |
| 2016/0127517 A1 | 5/2016 | Shcherbakov et al. | |
| 2018/0013685 A1* | 1/2018 | Yu | H04L 43/0829 |

(Continued)

OTHER PUBLICATIONS

International Search Report and Written Opinion—PCT/US2022/072983—ISA/EPO—Dec. 8, 2022.

*Primary Examiner* — Richard G Keehn
(74) *Attorney, Agent, or Firm* — Harrity & Harrity, LLP

(57) ABSTRACT

Various aspects of the present disclosure generally relate to wireless communication. In some aspects, an initiator device may transmit a protocol data unit (PDU) associated with a first stream during a first subevent within a portion of an event that is shared between the first stream and a second stream. Additionally, or alternatively, the initiator device may transmit a PDU associated with the second stream during a second subevent within the portion of the event that is shared between the first stream and the second stream. Numerous other aspects are described.

30 Claims, 19 Drawing Sheets

100 ➔

(56)            References Cited

U.S. PATENT DOCUMENTS

| | | | |
|---|---|---|---|
| 2019/0271496 A1* | 9/2019 | Sigmund | F25C 5/06 |
| 2020/0260322 A1* | 8/2020 | Chen | H04L 1/16 |
| 2020/0260448 A1* | 8/2020 | Chen | H04W 72/0453 |
| 2020/0336520 A1* | 10/2020 | Redding | H04L 1/0016 |
| 2021/0376884 A1* | 12/2021 | Linsky | H04W 4/80 |
| 2022/0094477 A1* | 3/2022 | Chen | H04L 69/22 |
| 2022/0116711 A1* | 4/2022 | Haggai | H04R 5/04 |
| 2023/0039791 A1* | 2/2023 | Paladugu | H04W 80/10 |
| 2023/0136426 A1* | 5/2023 | Cheng | H04W 40/24 |

* cited by examiner

CIS Length 653

CIG Length 601

650

700

CIG Event 701

CIS 703a 705a 705b 705c 705d 705e

CIS 703b 707a 707b 707c 707d 707e

Offset 709

800

900

1010 — Transmit a PDU associated with a first stream during a first subevent within a portion of an event that is shared between the first stream and a second stream 1020 — Transmit a PDU associated with the second stream during a second subevent within the portion of the event that is shared between the first stream and the second stream

1000

1110 Activate a low power mode during one or more first subevents within an event that is shared between a first stream for the acceptor device and a second stream 1120 Listen for a PDU associated with the first stream during one or more second subevents within the event

1100

SHARED SUBEVENTS FOR PROTOCOL DATA UNITS ASSOCIATED WITH DIFFERENT STREAMS

CROSS-REFERENCE TO RELATED APPLICATIONS

This Patent Application is a 371 national stage of PCT Application No. PCT/US2022/072983 filed on Jun. 16, 2022, entitled "SHARED SUBEVENTS FOR PROTOCOL DATA UNITS ASSOCIATED WITH DIFFERENT STREAMS," which claims priority to Indian Provisional Patent Application No. 202241020281, filed on Apr. 4, 2022, entitled "SHARED SUBEVENTS FOR PROTOCOL DATA UNITS ASSOCIATED WITH DIFFERENT STREAMS," The disclosure of the prior Applications is are considered part of and are hereby expressly incorporated by reference in this Patent Application.

FIELD OF THE DISCLOSURE

Aspects of the present disclosure generally relate to wireless communication and to techniques and apparatuses for using shared subevents for protocol data units associated with different streams.

BACKGROUND

Wireless communication systems are widely deployed to provide various telecommunication services such as telephony, video, data, messaging, and broadcasts. Typical wireless communication systems may employ multiple-access technologies capable of supporting communication with multiple users by sharing available system resources (e.g., bandwidth, transmit power, or the like). Examples of such multiple-access technologies include code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, time division synchronous code division multiple access (TD-SCDMA) systems, and Bluetooth®. Bluetooth® Low Energy (LE) is a set of enhancements to the Bluetooth® Classic standard promulgated by the Bluetooth® Special Interest Group (SIG) and uses 2.4 GHz radio frequencies like Bluetooth® Classic.

A Bluetooth® connection may include an initiator that supports communication for an acceptor or multiple acceptors. An acceptor may communicate with a base station via unidirectional connected isochronous streams (CISs) and/or bidirectional CISs. "Unidirectional" refers to a communication link from the initiator to the acceptor or from the acceptor to the initiator, and "bidirectional" refers to a communication link from the initiator to the acceptor and from the acceptor to the initiator.

The above technologies have been adopted in various devices to provide a common protocol that enables different initiator and acceptor devices to communicate on a municipal, national, regional, and/or global level. As the demand for short-range (e.g., within 100 meters) wireless communication continues to increase, further improvements in Bluetooth® and other radio access technologies remain useful.

SUMMARY

Some aspects described herein relate to an apparatus for wireless communication at an initiator device. The apparatus may include a memory and one or more processors coupled to the memory. The one or more processors may be configured to transmit a protocol data unit (PDU) associated with a first stream during a first subevent within a portion of an event that is shared between the first stream and a second stream. Additionally, or alternatively, the one or more processors may be configured to transmit a PDU associated with the second stream during a second subevent within the portion of the event that is shared between the first stream and the second stream.

Some aspects described herein relate to an apparatus for wireless communication at an acceptor device. The apparatus may include a memory and one or more processors coupled to the memory. The one or more processors may be configured to activate a low power mode during one or more first subevents within an event that is shared between a first stream for the acceptor device and a second stream. The one or more processors may be further configured to listen for a PDU associated with the first stream during one or more second subevents within the event.

Some aspects described herein relate to a method of wireless communication performed by an initiator device. The method may include transmitting a PDU associated with a first stream during a first subevent within a portion of an event that is shared between the first stream and a second stream. Additionally, or alternatively, the method may include transmitting a PDU associated with the second stream during a second subevent within the portion of the event that is shared between the first stream and the second stream.

Some aspects described herein relate to a method of wireless communication performed by an acceptor device. The method may include activating a low power mode during one or more first subevents within an event that is shared between a first stream for the acceptor device and a second stream. The method may further include listening for a PDU associated with the first stream during one or more second subevents within the event.

Some aspects described herein relate to a non-transitory computer-readable medium that stores a set of instructions for wireless communication by an initiator device. The one or more instructions, when executed by one or more processors of the initiator device, may cause the initiator device to transmit a PDU associated with a first stream during a first subevent within a portion of an event that is shared between the first stream and a second stream. Additionally, or alternatively, the set of instructions, when executed by one or more processors of the initiator device, may cause the initiator device to transmit a PDU associated with the second stream during a second subevent within the portion of the event that is shared between the first stream and the second stream.

Some aspects described herein relate to a non-transitory computer-readable medium that stores a set of instructions for wireless communication by an acceptor device. The set of instructions, when executed by one or more processors of the acceptor device, may cause the acceptor device to activate a low power mode during one or more first subevents within an event that is shared between a first stream for the acceptor device and a second stream. The set of instructions, when executed by one or more processors of the acceptor device, may further cause the acceptor device to listen for a PDU associated with the first stream during one or more second subevents within the event.

Some aspects described herein relate to an apparatus for wireless communication. The apparatus may include means for transmitting a PDU associated with a first stream during a first subevent within a portion of an event that is shared between the first stream and a second stream. Additionally, or alternatively, the apparatus may include means for transmitting a PDU associated with the second stream during a second subevent within the portion of the event that is shared between the first stream and the second stream.

Some aspects described herein relate to an apparatus for wireless communication. The apparatus may include means for activating a low power mode during one or more first subevents within an event that is shared between a first stream for the apparatus and a second stream. The apparatus may include means for listening for a PDU associated with the first stream during one or more second subevents within the event.

Aspects generally include a method, apparatus, system, computer program product, non-transitory computer-readable medium, user equipment, base station, wireless communication device, and/or processing system as substantially described herein with reference to and as illustrated by the drawings and specification.

The foregoing has outlined rather broadly the features and technical advantages of examples according to the disclosure in order that the detailed description that follows may be better understood. Additional features and advantages will be described hereinafter. The conception and specific examples disclosed may be readily utilized as a basis for modifying or designing other structures for carrying out the same purposes of the present disclosure. Such equivalent constructions do not depart from the scope of the appended claims. Characteristics of the concepts disclosed herein, both their organization and method of operation, together with associated advantages, will be better understood from the following description when considered in connection with the accompanying figures. Each of the figures is provided for the purposes of illustration and description, and not as a definition of the limits of the claims.

While aspects are described in the present disclosure by illustration to some examples, those skilled in the art will understand that such aspects may be implemented in many different arrangements and scenarios. Techniques described herein may be implemented using different platform types, devices, systems, shapes, sizes, and/or packaging arrangements. For example, some aspects may be implemented via integrated chip embodiments or other non-module-component based devices (e.g., end-user devices, vehicles, communication devices, computing devices, industrial equipment, retail/purchasing devices, medical devices, and/or artificial intelligence devices). Aspects may be implemented in chip-level components, modular components, non-modular components, non-chip-level components, device-level components, and/or system-level components. Devices incorporating described aspects and features may include additional components and features for implementation and practice of claimed and described aspects. For example, transmission and reception of wireless signals may include one or more components for analog and digital purposes (e.g., hardware components including antennas, radio frequency (RF) chains, power amplifiers, modulators, buffers, processors, interleavers, adders, and/or summers). It is intended that aspects described herein may be practiced in a wide variety of devices, components, systems, distributed arrangements, and/or end-user devices of varying size, shape, and constitution.

BRIEF DESCRIPTION OF THE DRAWINGS

So that the above-recited features of the present disclosure can be understood in detail, a more particular description, briefly summarized above, may be had by reference to aspects, some of which are illustrated in the appended drawings. It is to be noted, however, that the appended drawings illustrate only certain typical aspects of this disclosure and are therefore not to be considered limiting of its scope, for the description may admit to other equally effective aspects. The same reference numbers in different drawings may identify the same or similar elements.

DETAILED DESCRIPTION

Various aspects of the disclosure are described more fully hereinafter with reference to the accompanying drawings. This disclosure may, however, be embodied in many different forms and should not be construed as limited to any specific structure or function presented throughout this disclosure. Rather, these aspects are provided so that this disclosure will be thorough and complete, and will fully convey the scope of the disclosure to those skilled in the art. One skilled in the art should appreciate that the scope of the disclosure is intended to cover any aspect of the disclosure disclosed herein, whether implemented independently of or combined with any other aspect of the disclosure. For example, an apparatus may be implemented or a method may be practiced using any number of the aspects set forth herein. In addition, the scope of the disclosure is intended to cover such an apparatus or method which is practiced using other structure, functionality, or structure and functionality in addition to or other than the various aspects of the disclosure set forth herein. It should be understood that any aspect of the disclosure disclosed herein may be embodied by one or more elements of a claim.

Several aspects of telecommunication systems will now be presented with reference to various apparatuses and techniques. These apparatuses and techniques will be described in the following detailed description and illustrated in the accompanying drawings by various blocks, modules, components, circuits, steps, processes, algorithms, or the like (collectively referred to as "elements"). These elements may be implemented using hardware, software, or combinations thereof. Whether such elements are implemented as hardware or software depends upon the particular application and design constraints imposed on the overall system.

While aspects may be described herein using terminology commonly associated with Bluetooth® LE technology, aspects of the present disclosure can be applied to other technologies, such as Bluetooth® Classic.

Figure 1:
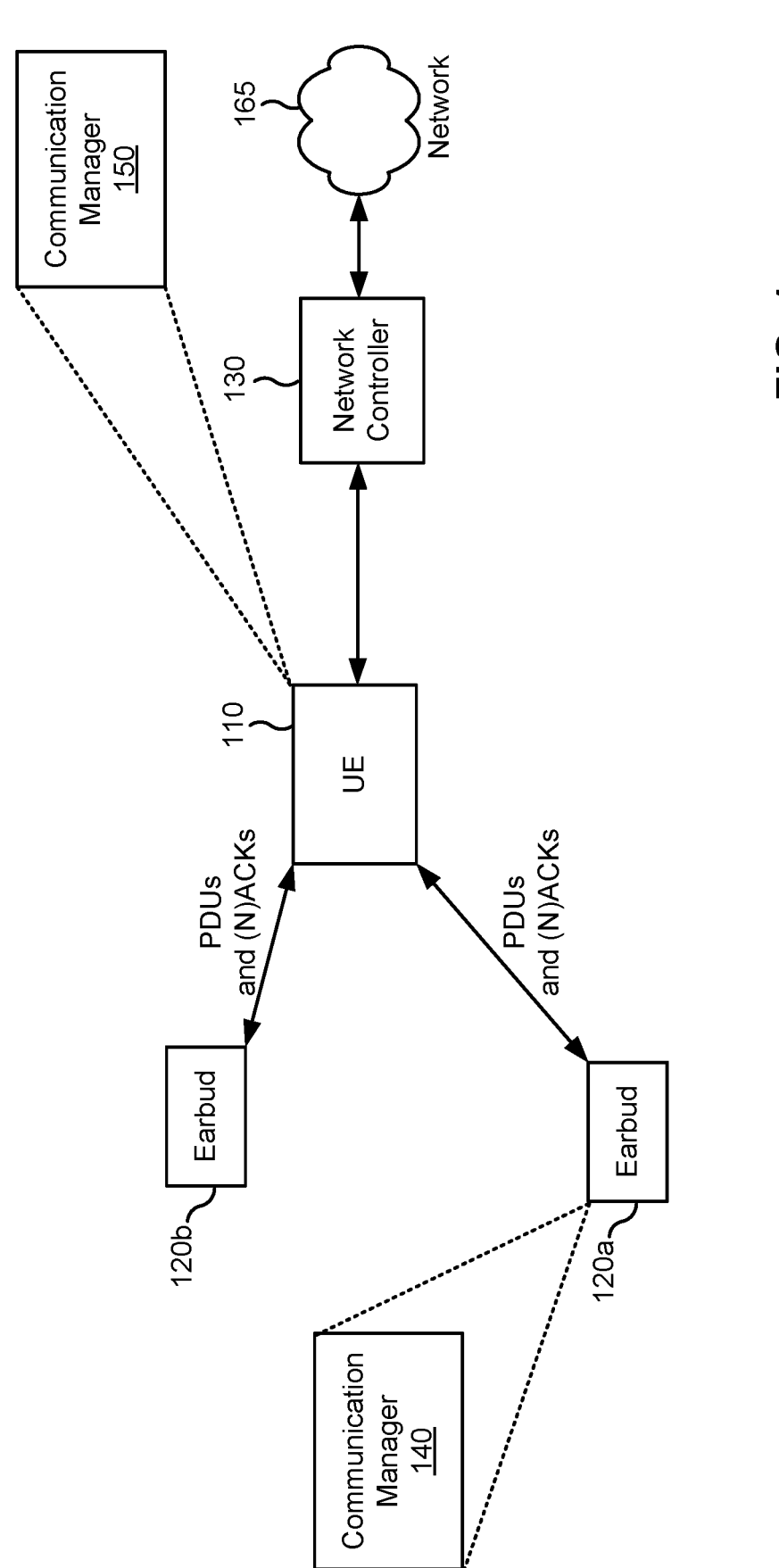
FIG. 1 is a diagram illustrating an example of a Bluetooth® network, in accordance with the present disclosure.

FIG. 1 is a diagram illustrating an example of a wireless network 100, in accordance with the present disclosure. The wireless network 100 may be or may include elements of a Bluetooth® network. The wireless network 100 may include an initiator device 110 (shown as a user equipment (UE) 110), an acceptor device 120 or multiple acceptor devices 120 (shown as an earbud 120a and an earbud 120b), and/or other network entities. An initiator device 110 is an entity that communicates with acceptor devices 120. An initiator device 110 (sometimes referred to as a client or a central device) may include, for example, a UE and/or another type of controller device. An acceptor device 120 (sometimes referred to as a server device or a peripheral device) may include, for example, an earbud, a microphone, a camera, and/or another type of accessory device.

The UE 110 and the earbuds 120 may communicate on a channel using Bluetooth® procedures, such as one or more procedures in the Bluetooth® LE protocols. For example, the UE 110 may transmit data to the earbuds 120 for the earbuds 120 to decode (e.g., to generate audio accordingly). Additionally, or alternatively, the earbuds 120 may transmit data (e.g., based on received audio) to the UE 110 to forward to a server and/or another remote device via a network 165 (such as the Internet, a long term evolution (LTE) network, a 5G or New Radio (NR) network, and/or another type of network). Accordingly, the UE 110 may be connected to the network 165 via a wired and/or wireless connection with a network controller 130. The network controller 130 may communicate with the UE 110 via a wireless communication link (e.g., using a contention-based standard like the Institute of Electrical and Electronics Engineers (IEEE) Local Area Network/Metropolitan Area Network (LAN/MAN) Standards Committee's 802.11 standards (also referred to as "IEEE 802.11 protocols") or standards promulgated by the Third Generation Partnership Project (3GPP)) and/or a wired communication link.

The UE 110 may be stationary or mobile. The UE 110 may be a cellular phone (e.g., a smart phone), a personal digital assistant (PDA), a wireless modem, a wireless communication device, a handheld device, a laptop computer, a cordless phone, a wireless local loop (WLL) station, a tablet, a camera, a gaming device, a netbook, a smartbook, an ultrabook, a medical device, a biometric device, a wearable device (e.g., a smart watch, smart clothing, smart glasses, a smart wristband, smart jewelry (e.g., a smart ring or a smart bracelet)), an entertainment device (e.g., a music device, a video device, and/or a satellite radio), a vehicular component or sensor, a smart meter/sensor, industrial manufacturing equipment, a global positioning system device, and/or any other suitable device that is configured to communicate via a wireless medium. Similarly, the earbuds 120 may be dispersed throughout the wireless network 100, and each earbud 120 may be stationary or mobile.

Some acceptor devices may be considered machine-type communication (MTC) or evolved or enhanced machine-type communication (eMTC) UEs, such as a robot, a drone, a remote device, a sensor, a meter, a monitor, and/or a location tag, that may communicate with a base station, another device (e.g., a remote device), or some other entity. Some acceptor devices may be considered Internet-of-Things (IoT) devices, and/or may be implemented as NB-IoT (narrowband IoT) devices. An acceptor device may be included inside a housing that houses components of the acceptor device, such as processor components and/or memory components. In some examples, the processor components and the memory components may be coupled together. For example, the processor components (e.g., one or more processors) and the memory components (e.g., a memory) may be operatively coupled, communicatively coupled, electronically coupled, and/or electrically coupled.

In general, any number of wireless networks 100 may be deployed in a given geographic area. Each wireless network 100 may operate on one or more frequencies. Accordingly, devices of the wireless network 100 may communicate using the electromagnetic spectrum, which may be subdivided by frequency or wavelength into various classes, bands, channels, or the like. For example, devices of the wireless network 100 may communicate using one or more operating bands. In Bluetooth®, an operating band is usually an industrial, scientific and medical (ISM) band (e.g., the 2.400 GHz-2.4835 GHz band).

In some aspects, the acceptor device 120 may include a communication manager 140. As described in more detail elsewhere herein, the communication manager 140 may activate a low power mode, during one or more first subevents within an event that is shared between a first stream for the acceptor device and a second stream for an additional acceptor device, and listen for a protocol data unit (PDU) associated with the first stream during one or more second subevents within the event. Additionally, or alternatively, the communication manager 140 may perform one or more other operations described herein.

In some aspects, the initiator device 110 may include a communication manager 150. As described in more detail elsewhere herein, the communication manager 150 may transmit a PDU associated with a first stream during a first subevent within a portion of an event that is shared between the first stream and a second stream and/or transmit a PDU associated with the second stream during a second subevent within the portion of the event that is shared between the first stream and the second stream. Additionally, or alternatively, the communication manager 150 may perform one or more other operations described herein.

As indicated above, FIG. 1 is provided as an example. Other examples may differ from what is described with regard to FIG. 1.

Figure 2:
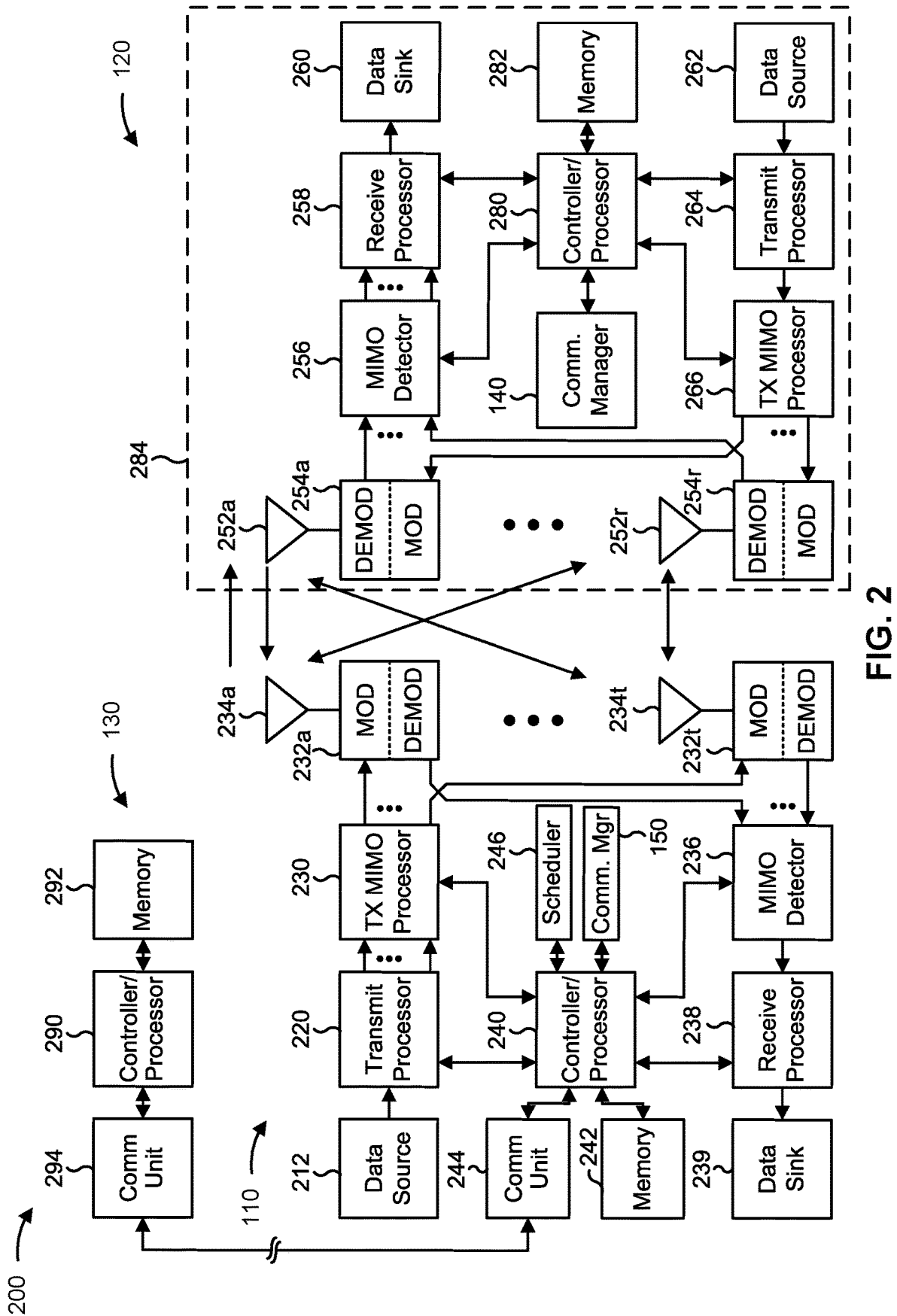
FIG. 2 is a diagram illustrating an example of an initiator device in communication with an acceptor device in a Bluetooth® network, in accordance with the present disclosure.

FIG. 2 is a diagram illustrating an example 200 of an initiator device 110 in communication with an acceptor device 120 in a wireless network 100, in accordance with the present disclosure. The initiator device 110 may be equipped with a set of antennas 234a through 234t, such as T antennas (T≥1). The acceptor device 120 may be equipped with a set of antennas 252a through 252r, such as R antennas (R≥1).

At the initiator device 110, a transmit processor 220 may receive data, from a data source 212, intended for the acceptor device 120 (or a set of acceptor devices 120). The transmit processor 220 may select one or more modulation and coding schemes (MCSs) for the acceptor device 120 based at least in part on one or more channel quality indicators (CQIs) received from that acceptor device 120. The initiator device 110 may process (e.g., encode and modulate) the data for the acceptor device 120 based at least in part on the MCS(s) selected for the acceptor device 120 and may provide data symbols for the acceptor device 120. The transmit processor 220 may process system information (e.g., for semi-static resource partitioning information (SRPI)) and control information (e.g., CQI requests, grants, and/or upper layer signaling) and provide overhead symbols and control symbols. The transmit processor 220 may generate reference symbols for reference signals (e.g., a cell-specific reference signal (CRS) or a demodulation reference signal (DMRS)) and synchronization signals (e.g., a primary synchronization signal (PSS) or a secondary synchronization signal (SSS)). A transmit (TX) multiple-input multiple-output (MIMO) processor 230 may perform spatial processing (e.g., precoding) on the data symbols, the control symbols, the overhead symbols, and/or the reference symbols, if applicable, and may provide a set of output symbol streams (e.g., T output symbol streams) to a corresponding set of modems 232 (e.g., T modems), shown as modems 232a through 232t. For example, each output symbol stream may be provided to a modulator component (shown as MOD) of a modem 232. Each modem 232 may use a respective modulator component to process a respective output symbol stream (e.g., for OFDM) to obtain an output sample stream. Each modem 232 may further use a respective modulator component to process (e.g., convert to analog, amplify, filter, and/or upconvert) the output sample stream to obtain a downlink signal. The modems 232a through 232t may transmit a set of downlink signals (e.g., T downlink signals) via a corresponding set of antennas 234 (e.g., T antennas), shown as antennas 234a through 234t.

At the acceptor device 120, a set of antennas 252 (shown as antennas 252a through 252r) may receive the downlink signals from the initiator device 110 and may provide a set of received signals (e.g., R received signals) to a set of modems 254 (e.g., R modems), shown as modems 254a through 254r. For example, each received signal may be provided to a demodulator component (shown as DEMOD) of a modem 254. Each modem 254 may use a respective demodulator component to condition (e.g., filter, amplify, downconvert, and/or digitize) a received signal to obtain input samples. Each modem 254 may use a demodulator component to further process the input samples (e.g., for OFDM) to obtain received symbols. A MIMO detector 256 may obtain received symbols from the modems 254, may perform MIMO detection on the received symbols if applicable, and may provide detected symbols. A receive processor 258 may process (e.g., demodulate and decode) the detected symbols, may provide decoded data for the acceptor device 120 to a data sink 260, and may provide decoded control information and system information to a controller/processor 280. The term "controller/processor" may refer to one or more controllers, one or more processors, or a combination thereof. A channel processor may determine a reference signal received power (RSRP) parameter, a received signal strength indicator (RSSI) parameter, a reference signal received quality (RSRQ) parameter, and/or a CQI parameter, among other examples. In some examples, one or more components of the acceptor device 120 may be included in a housing 284.

The network controller 130 may include a communication unit 294, a controller/processor 290, and a memory 292. The network controller 130 may include, for example, a WiFi device and/or a base station in a cellular network, among other examples. The network controller 130 may communicate with the initiator device 110 via the communication unit 294.

One or more antennas (e.g., antennas 234a through 234t and/or antennas 252a through 252r) may include, or may be included within, one or more antenna panels, one or more antenna groups, one or more sets of antenna elements, and/or one or more antenna arrays, among other examples. An antenna panel, an antenna group, a set of antenna elements, and/or an antenna array may include one or more antenna elements (within a single housing or multiple housings), a set of coplanar antenna elements, a set of non-coplanar antenna elements, and/or one or more antenna elements coupled to one or more transmission and/or reception components, such as one or more components of FIG. 2.

On the uplink, at the acceptor device 120, a transmit processor 264 may receive and process data from a data source 262 and control information (e.g., for reports that include RSRP, RSSI, RSRQ, and/or CQI) from the controller/processor 280. The transmit processor 264 may generate reference symbols for one or more reference signals. The symbols from the transmit processor 264 may be precoded by a TX MIMO processor 266 if applicable, further processed by the modems 254 (e.g., for DFT-s-OFDM or CP-OFDM), and transmitted to the initiator device 110. In some examples, the modem 254 of the acceptor device 120 may include a modulator and a demodulator. In some examples, the acceptor device 120 includes a transceiver. The transceiver may include any combination of the antenna(s) 252, the modem(s) 254, the MIMO detector 256, the receive processor 258, the transmit processor 264, and/or the TX MIMO processor 266. The transceiver may be used by a processor (e.g., the controller/processor 280) and the memory 282 to perform aspects of any of the methods described herein (e.g., with reference to FIGS. 5A, 5B, 5C, 6A, 6B, 7, 8A, 8B, and 9-13).

At the initiator device 110, the uplink signals from acceptor device 120 and/or other acceptor devices may be received by the antennas 234, processed by the modem 232 (e.g., a demodulator component, shown as DEMOD, of the modem 232), detected by a MIMO detector 236 if applicable, and further processed by a receive processor 238 to obtain decoded data and control information sent by the acceptor device 120. The receive processor 238 may provide the decoded data to a data sink 239 and provide the decoded control information to the controller/processor 240. The initiator device 110 may include a communication unit 244 and may communicate with the network controller 130 via the communication unit 244. The initiator device 110 may include a scheduler 246 to schedule one or more acceptor devices 120 for downlink and/or uplink communications. In some examples, the modem 232 of the initiator device 110 may include a modulator and a demodulator. In some examples, the initiator device 110 includes a transceiver. The transceiver may include any combination of the antenna(s) 234, the modem(s) 232, the MIMO detector 236, the receive processor 238, the transmit processor 220, and/or the TX MIMO processor 230. The transceiver may be used by a processor (e.g., the controller/processor 240) and the memory 242 to perform aspects of any of the methods described herein (e.g., with reference to FIGS. 5A, 5B, 5C, 6A, 6B, 7, 8A, 8B, and 9-13).

The controller/processor 240 of the initiator device 110, the controller/processor 280 of the acceptor device 120, and/or any other component(s) of FIG. 2 may perform one or more techniques associated with using shared subevents for PDUs associated with different streams, as described in more detail elsewhere herein. For example, the controller/processor 240 of the initiator device 110, the controller/processor 280 of the acceptor device 120, and/or any other component(s) of FIG. 2 may perform or direct operations of, for example, process 1000 of FIG. 10, process 1100 of FIG. 11, and/or other processes as described herein. The memory 242 and the memory 282 may store data and program codes for the initiator device 110 and the acceptor device 120, respectively. In some examples, the memory 242 and/or the memory 282 may include a non-transitory computer-readable medium storing one or more instructions (e.g., code and/or program code) for wireless communication. For example, the one or more instructions, when executed (e.g., directly, or after compiling, converting, and/or interpreting) by one or more processors of the initiator device 110 and/or the acceptor device 120, may cause the one or more processors, the acceptor device 120, and/or the initiator device 110 to perform or direct operations of, for example, process 1000 of FIG. 10, process 1100 of FIG. 11, and/or other processes as described herein. In some examples, executing instructions may include running the instructions, converting the instructions, compiling the instructions, and/or interpreting the instructions, among other examples.

In some aspects, the initiator device 110 may include means for transmitting a PDU associated with a first stream during a first subevent within a portion of an event that is shared between the first stream and a second stream and/or means for transmitting a PDU associated with the second stream during a second subevent within the portion of the event that is shared between the first stream and the second stream. In some aspects, the means for the initiator device 110 to perform operations described herein may include, for example, one or more of communication manager 150, transmit processor 220, TX MIMO processor 230, modem 232, antenna 234, MIMO detector 236, receive processor 238, controller/processor 240, memory 242, or scheduler 246.

In some aspects, the acceptor device 120 may include means for activating a low power mode during one or more first subevents within an event that is shared between a first stream for the acceptor device and a second stream for an additional acceptor device; and/or means for listening for a PDU associated with the first stream during one or more second subevents within the event. In some aspects, the means for the acceptor device 120 to perform operations described herein may include, for example, one or more of communication manager 140, antenna 252, modem 254, MIMO detector 256, receive processor 258, transmit processor 264, TX MIMO processor 266, controller/processor 280, or memory 282.

While blocks in FIG. 2 are illustrated as distinct components, the functions described above with respect to the blocks may be implemented in a single hardware, software, or combination component or in various combinations of components. For example, the functions described with respect to the transmit processor 264, the receive processor 258, and/or the TX MIMO processor 266 may be performed by or under the control of the controller/processor 280.

As indicated above, FIG. 2 is provided as an example. Other examples may differ from what is described with regard to FIG. 2.

Figure 3:
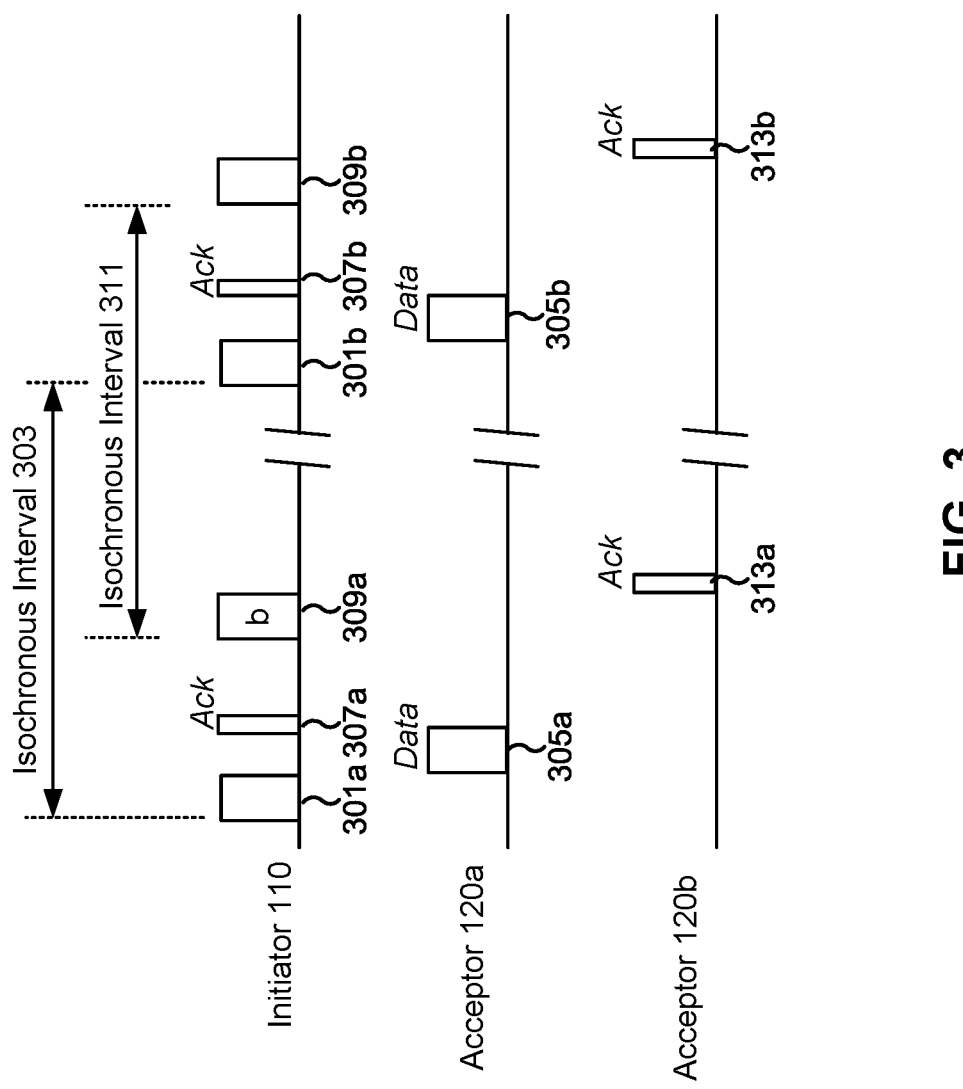
FIG. 3 is a diagram illustrating an example of isochronous intervals, in accordance with the present disclosure.

FIG. 3 is a diagram illustrating an example 300 of isochronous intervals, in accordance with the present disclosure. In example 300, an initiator 110 may communicate on a bidirectional CIS with a first acceptor 120a and on a unidirectional CIS with a second acceptor 120b. Although described using one bidirectional CIS and one unidirectional CIS, the description similarly applies to two bidirectional CISs or two unidirectional CISs. Additionally, or alternatively, although described using two acceptors, the description similarly applies to additional acceptors associated with additional CISs (e.g., three acceptors, four acceptors, and so on). Additionally, although described using two acceptor devices, the CISs may be associated with a same acceptor device (e.g., a headset device using a first CIS for a left earbud and a second CIS for a right earbud).

The CISs with the acceptors 120a and 120b may be logically organized into a connected isochronous group (CIG). Accordingly, as shown in FIG. 3, the initiator 110 may transmit data 301a (e.g., in the form of a PDU) to the acceptor 120a during a first subevent within a CIG event. Because the CIS associated with the acceptor 120a is bidirectional, the acceptor 120a may respond to the PDU from the initiator 110 with data 305a (e.g., in the form of a PDU) during the first subevent. Accordingly, the initiator 110 may transmit an acknowledgement (ACK) PDU 307a based on receiving the data 305a (or a negative-acknowledgement (NACK) PDU based on not receiving the data 305a). Alternatively, the initiator 110 may refrain from transmitting the ACK 307a (or the NACK PDU) and instead allow the acceptor 120a to enter a sync timeout mode.

In some aspects, when the initiator 110 does not have data to transmit in the first subevent, the initiator 110 may still transmit a null PDU to the acceptor 120a in order to provide an opportunity for the acceptor 120a to reply with data. Alternatively, when the acceptor 120a does not have data to transmit in the first subevent, the acceptor 120a may transmit an ACK PDU based on receiving the data 301a (or a NACK PDU based on not receiving the data 301a) in lieu of the data 305a. For example, the acceptor 120a may transmit the ACK PDU (or NACK PDU) similarly as described for the acceptor 120b.

The CIS associated with the acceptor 120a may therefore be characterized by an isochronous interval 303 between a start of the first subevent for the CIS within one CIG event and a start of a corresponding subevent for the CIS within a subsequent CIG event. When the data 301a is not received during the first subevent, the initiator 110 will attempt to retransmit the data 301a in one or more subsequent subevents until the data 301a is received (or until the end of the CIG event, whichever is earlier). At the end of the CIG event, the initiator 110 may discard the data 301a (e.g., when a flush timeout for the data 301a is set to one, such as 1 CIG event). Therefore, as shown in FIG. 3, the initiator 110 may transmit data 301b during a first subevent of the subsequent CIG event. Alternatively, the initiator 110 may retransmit the data 301a during one or more subevents of the subsequent CIG event (e.g., when a flush timeout for the data 301a is larger than one, such as 2 CIG events, 3 CIG events, and so on). Similarly, the acceptor 120a may transmit data 305b or may retransmit the data 305a during the subsequent CIG event. Accordingly, the initiator 110 may transmit an ACK PDU 307b based on receiving the data 305b or the retransmitted data 305a (or a NACK PDU based on not receiving the data 305b or the retransmitted data 305a).

As further shown in FIG. 3, the initiator 110 may transmit data 309a (e.g., in the form of a PDU) to the acceptor 120b during a second subevent within a CIG event. Because the CIS associated with the acceptor 120b is unidirectional, the acceptor 120b may respond to the PDU from the initiator 110 with an ACK PDU 313a based on receiving the data 309a (or a NACK PDU based on not receiving the data 309a).

The CIS associated with the acceptor 120b may therefore be characterized by an isochronous interval 311 between a start of the second subevent for the CIS within one CIG event and a start of a corresponding subevent for the CIS within a subsequent CIG event. When the data 309a is not received during the second subevent, the initiator 110 will attempt to retransmit the data 309a in one or more subsequent subevents until the data 309a is received (or until the end of the CIG event, whichever is earlier). At the end of the CIG event, the initiator 110 may discard the data 309a (e.g., when a flush timeout for the data 309a is set to one, such as 1 CIG event). Therefore, as shown in FIG. 3, the initiator 110 may transmit data 309b during a second subevent the subsequent CIG event. Alternatively, the initiator 110 may retransmit the data 309a during one or more subevents of the subsequent CIG event (e.g., when a flush timeout for the data 309a is larger than one, such as 2 CIG events, 3 CIG events, and so on). Accordingly, the acceptor 120b may transmit an ACK PDU 313b based on receiving the data 309b or the retransmitted data 309a (or a NACK PDU based on not receiving the data 309b or the retransmitted data 309a).

As indicated above, FIG. 3 is provided as an example. Other examples may differ from what is described with respect to FIG. 3.

Figure 4A:
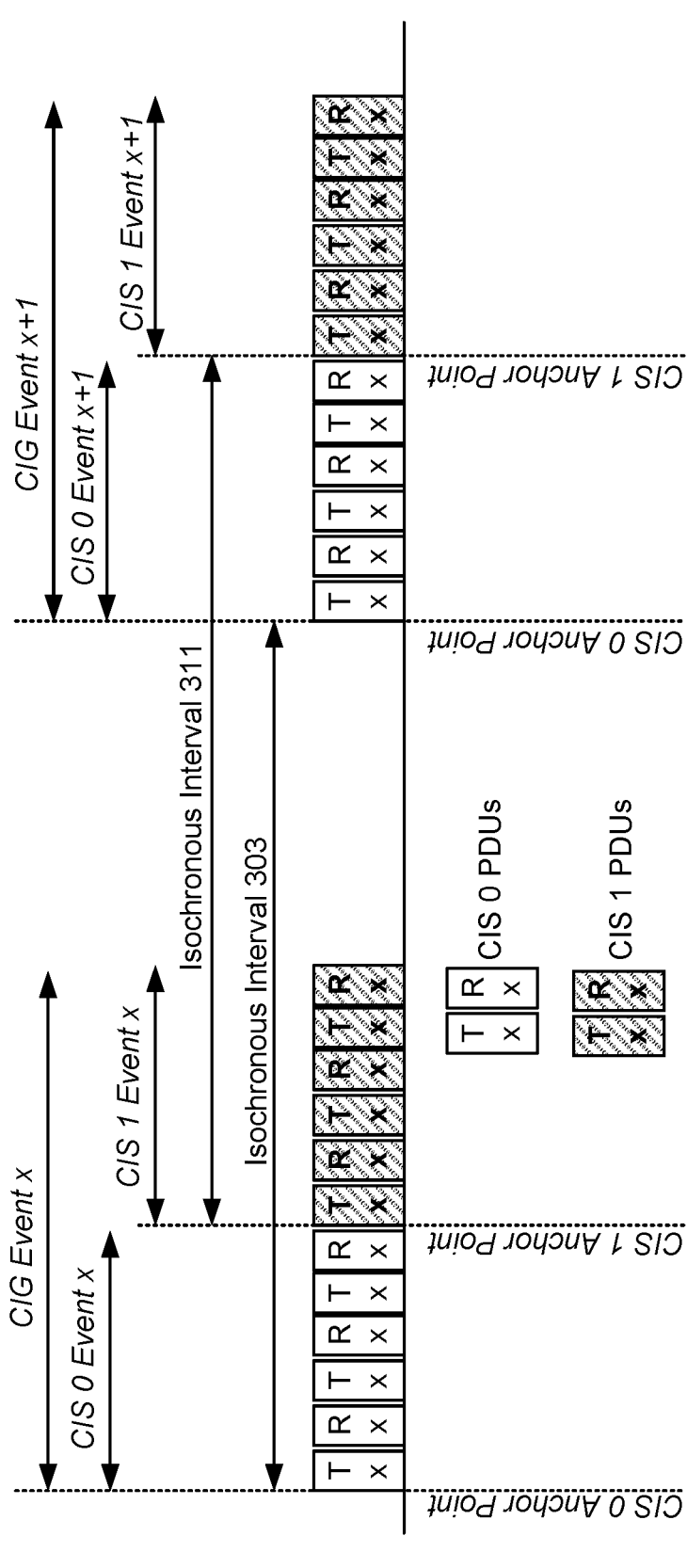
FIGS. 4A and 4B are diagrams illustrating examples associated with subevent packing schemes, in accordance with the present disclosure.

FIG. 4A is a diagram illustrating an example 400 associated with a sequential packing scheme for subevents, in accordance with the present disclosure. As shown in FIG. 4A, example 400 includes a first CIS (labeled "CIS 0") between a first acceptor (e.g., acceptor 120a) and an initiator (e.g., initiator 110) and a second CIS (labeled "CIS 1") between a second acceptor (e.g., acceptor 120b) and the initiator 110. Although described using bidirectional CISs, the description similarly applies to unidirectional CISs or a combination of unidirectional and bidirectional CISs. Additionally, or alternatively, although described using two acceptors, the description similarly applies to additional acceptors associated with additional CISs (e.g., three acceptors, four acceptors, and so on). Additionally, although described using two acceptor devices, the CISs may be associated with a same acceptor device (e.g., a headset device using a first CIS for a left earbud and a second CIS for a right earbud).

As shown in FIG. 4A, each CIG event for the first CIS includes a first quantity of subevents (e.g., shown as three subevents in example 400, where each subevent includes a transmission ("Tx") and a reception ("Rx")). Accordingly, a duration associated with a first CIS event includes the subevents associated with the first CIS event within the CIG event. Additionally, a start of an initial subevent associated with the first CIS serves as an anchor point within each CIG event. Accordingly, the isochronous interval 303 spans across anchor points in subsequent CIG events (e.g., CIG event x+1 subsequent to CIG event x, where x is an integer).

Similarly, each CIG event for the second CIS includes a second quantity of subevents (e.g., shown as three subevents in example 400, where each subevent includes a Tx and an Rx). Accordingly, a duration associated with a second CIS event includes the subevents associated with the second CIS event within the CIG event. Additionally, a start of an initial subevent associated with the second CIS serves as an anchor point within each CIG event. Accordingly, the isochronous interval 311 spans across anchor points in subsequent CIG events (e.g., CIG event x+1 subsequent to CIG event x, where x is an integer).

Because the CIG events include all subevents for the first CIS followed by all subevents for the second CIS, example 400 is referred to as "sequential."

Figure 4B:
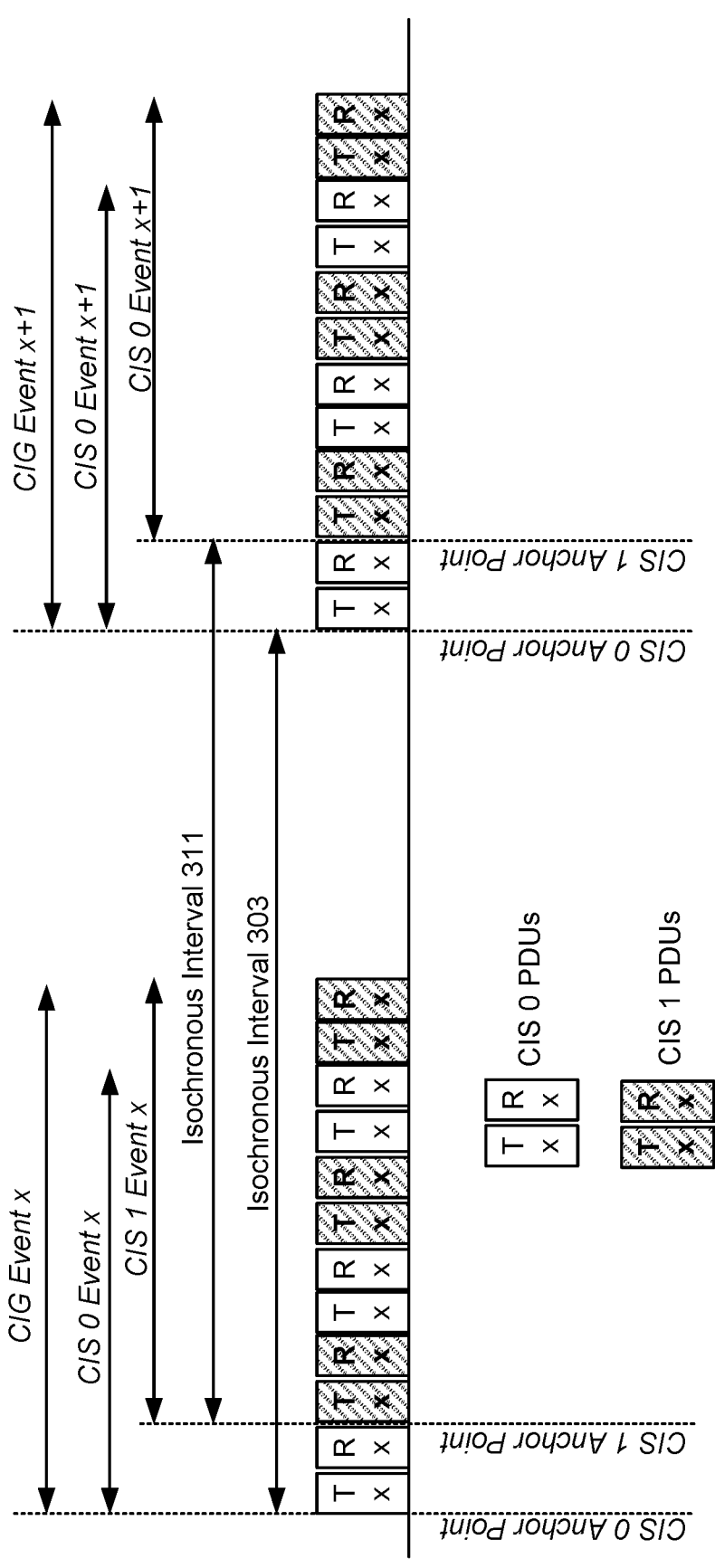

FIG. 4B is a diagram illustrating an example 450 associated with an interleaving packing scheme for subevents, in accordance with the present disclosure. Similar to example 400, example 450 includes a first CIS (labeled "CIS 0") between a first acceptor (e.g., acceptor 120a) and an initiator (e.g., initiator 110) and a second CIS (labeled "CIS 1") between a second acceptor (e.g., acceptor 120b) and the initiator 110. Although described using bidirectional CISs, the description similarly applies to unidirectional CISs or a combination of unidirectional and bidirectional CISs. Additionally, or alternatively, although described using two acceptors, the description similarly applies to additional acceptors associated with additional CISs (e.g., three acceptors, four acceptors, and so on). Additionally, although described using two acceptor devices, the CISs may be associated with a same acceptor device (e.g., a headset device using a first CIS for a left earbud and a second CIS for a right earbud).

As shown in FIG. 4B, each CIG event for the first CIS includes a first set of subevents (e.g., shown as three subevents in example 450, where each subevent includes a Tx and an Rx). Accordingly, a duration associated with a first CIS event includes the subevents associated with the first CIS event within the CIG event. Additionally, a start of an initial subevent associated with the first CIS serves as an anchor point within each CIG event. Accordingly, the isochronous interval 303 spans across anchor points in subsequent CIG events (e.g., CIG event x+1 subsequent to CIG event x, where x is an integer).

Similarly, each CIG event for the second CIS includes a second set of subevents (e.g., shown as three subevents in example 450, where each subevent includes a Tx and an Rx). Accordingly, a duration associated with a second CIS event includes the subevents associated with the second CIS event within the CIG event. Additionally, a start of an initial subevent associated with the second CIS serves as an anchor point within each CIG event. Accordingly, the isochronous interval 311 spans across anchor points in subsequent CIG events (e.g., CIG event x+1 subsequent to CIG event x, where x is an integer).

Because the first set of subevents for the first CIS alternate with the second set of subevents for the second CIS, example 450 is referred to as "interleaving."

Some techniques and apparatuses described herein enable one or more subevents within an event (e.g., a CIG event) to be shared between two or more streams (e.g., CISs). As a result, bandwidth for the CISs is used more compactly, which allows other devices (e.g., WiFi devices or other contention-based protocol devices) and/or other Bluetooth-based services (e.g., low energy (LE) asynchronous connection-less (ACL) links and/or basic rate/enhanced data rate (BR/EDR) links, among other examples) to make use of unoccupied bandwidth for the CISs more effectively. Accordingly, latency is reduced for the other devices, power and processing resources are conserved at the other devices, and throughput to the other devices and/or other services (e.g., WiFi) is increased. Furthermore, because the subevents may be shared without modifying behavior of acceptor devices, an initiator device may improve bandwidth use without software and hardware changes at the acceptor devices.

Some techniques and apparatuses described herein further enable an acceptor device to activate a low-power mode based on scheduling, by an initiator device, within one or more subevents that are shared (e.g., with different portions of the acceptor device and/or one or more additional acceptor devices). As a result, power is conserved at the acceptor device.

As indicated above, FIGS. 4A-4B are provided as examples. Other examples may differ from what is described with respect to FIGS. 4A-4B.

Figure 5A:
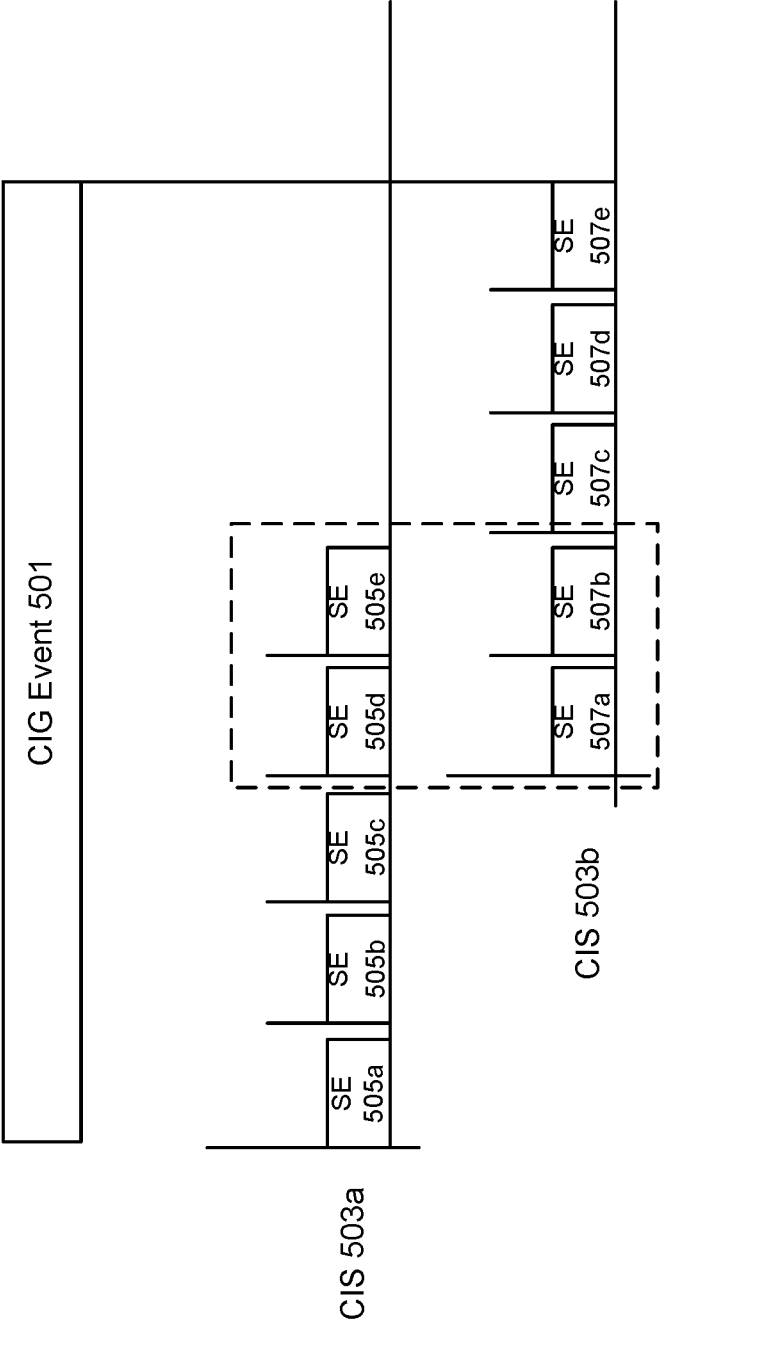
FIGS. 5A, 5B, 5C, and 5D are diagrams illustrating examples associated with sharing subevents between isochronous streams, in accordance with the present disclosure.

FIG. 5A is a diagram illustrating an example 500 associated with sharing subevents between isochronous streams, in accordance with the present disclosure. As shown in FIG. 5A, example 500 includes a CIG event 501 that includes eight subevents. For example, a number of subevents (NSE) variable associated with each CIS stream may be set to five. Although described in connection with eight total subevents, the description similarly applies to fewer subevents (e.g., seven subevents, six subevents, and so on) or additional subevents (e.g., nine subevents, ten subevents, and so on). Furthermore, although described in connection with both CIS streams having an equal quantity of subevents, the description similarly applies to the CIS steams having different quantities of subevents. Additionally, although described using two acceptor devices, the CISs may be associated with a same acceptor device (e.g., a headset device using a first CIS for a left earbud and a second CIS for a right earbud).

As shown in FIG. 5A, the first CIS 503a is associated with subevent 505a, subevent 505b, subevent 505c, subevent 505d, and subevent 505e. In example 500, subevents 505a, 505b, and 505c are within a portion of the CIG event 501 that is not shared with the second CIS 503b. Accordingly, an initiator device (e.g., initiator 110) may transmit a PDU to a first acceptor device (e.g., acceptor 120a) using the first CIS 503a during subevent 505a, subevent 505b, or subevent 505c.

Similarly, the second CIS 503b is associated with subevent 507a, subevent 507b, subevent 507c, subevent 507d, and subevent 507e. In example 500, subevents 507c, 507d, and 507e are within a portion of the CIG event 501 that is not shared with the first CIS 503a. Accordingly, the initiator 110 may transmit a PDU to a second acceptor device (e.g., acceptor 120b) using the second CIS 503b during subevent 507c, subevent 507d, or subevent 507e.

As further shown in FIG. 5A, subevents 505d and 505e for the first CIS 503a and subevents 507a and 507b for the second CIS 503b are within a portion of the CIG event 501 that is shared between the first CIS 503a and the second CIS 503b. Accordingly, the initiator 110 may transmit a PDU to the first acceptor 120a using the first CIS 503a or a PDU to the second acceptor 120b using the second CIS 503b during the subevent 505d/507a or the subevent 505e/507b.

Although described in connection with some subevents not being shared, the description similarly applies to a CIG event in which all subevents are shared between the first CIS and the second CIS (e.g., as described in connection with FIG. 6B).

In some aspects, the initiator 110 may select which CIS (e.g., the first CIS 503a or the second CIS 503b) to serve in a shared subevent (e.g., subevent 505d/507a or subevent 505e/507b) based on which CIS has a buffered PDU with a closer flush point. For example, the first CIS 503a may have a buffered PDU that does not expire until a subsequent CIG event, while the second CIS 503b has a buffered PDU that expires in the CIG event 501 (e.g., at the end of the CIG event 501). Accordingly, the initiator 110 may transmit the buffered PDU for the second CIS 503b in the subevent 507a (or subevent 507b). Similarly, the second CIS 503b may have a buffered PDU that does not expire until a subsequent CIG event, while the first CIS 503a has a buffered PDU that expires in the CIG event 501 (e.g., at the end of the CIG event 501). Accordingly, the initiator 110 may transmit the buffered PDU for the first CIS 503a in the subevent 505d (or subevent 505e). In case of a tie (e.g., equal flush points for buffered PDUs), the initiator 110 may randomly (or at least pseudo-randomly) select between the first CIS 503a and the second CIS 503b or may serve the first CIS 503a and the second CIS 503b in round robin (e.g., alternating between the first CIS 503a and the second CIS 503b in subevents whenever a flush point tie occurs). Alternatively, in case of a tie, the initiator 110 may select between the first CIS 503a and the second CIS 503b based on historical data. For example, the initiator 110 may select the first CIS 503a when a quantity of NACK PDUs received using the first CIS 503a satisfies a NACK threshold and/or when an RSRP and/or another measurement associated with signal strength of the first CIS 503a satisfies a signal strength threshold, among other examples. Similarly, the initiator 110 may select the second CIS 503b when a quantity of NACK PDUs received using the second CIS 503b satisfies a NACK threshold and/or when an RSRP and/or another measurement associated with signal strength of the second CIS 503b satisfies a signal strength threshold, among other examples.

Alternatively, the initiator 110 may serve the CISs in round robin across all shared subevents. Accordingly, in example 500, the initiator 110 may serve the first CIS 503a in the subevent 505d, the second CIS 503b in the subevent 507b, and so on, across subsequent shared subevents. Alternatively, the initiator 110 may randomly (or at least pseudo-randomly) select between the CISs across all shared subevents.

Alternatively, the initiator 110 may serve the CISs in round robin or randomly (or at least pseudo-randomly) for an initial quantity of shared subevents and then serve the CISs based on historical data (e.g., as described above) for subsequent shared subevents. The initial quantity of shared subevents may be programmed (and/or otherwise preconfigured) into the initiator 110 or may be dynamically determined (e.g., based on a quantity of CISs in the CIG and/or a quantity of data transmitted in total and/or across each CIS, among other examples). Alternatively, the initiator 110 may serve the CISs in round robin or randomly (or at least pseudo-randomly) for an initial quantity of shared subevents and then serve the CISs based on a closest flush point (e.g., as described above) for subsequent shared subevents. Similarly, the initiator 110 may serve the CISs based on historical data (e.g., as described above) and/or a closest flush point (e.g., as described above) for an initial quantity of shared subevents and then serve the CISs in round robin or randomly (or at least pseudo-randomly) for subsequent shared subevents.

Figure 5B:
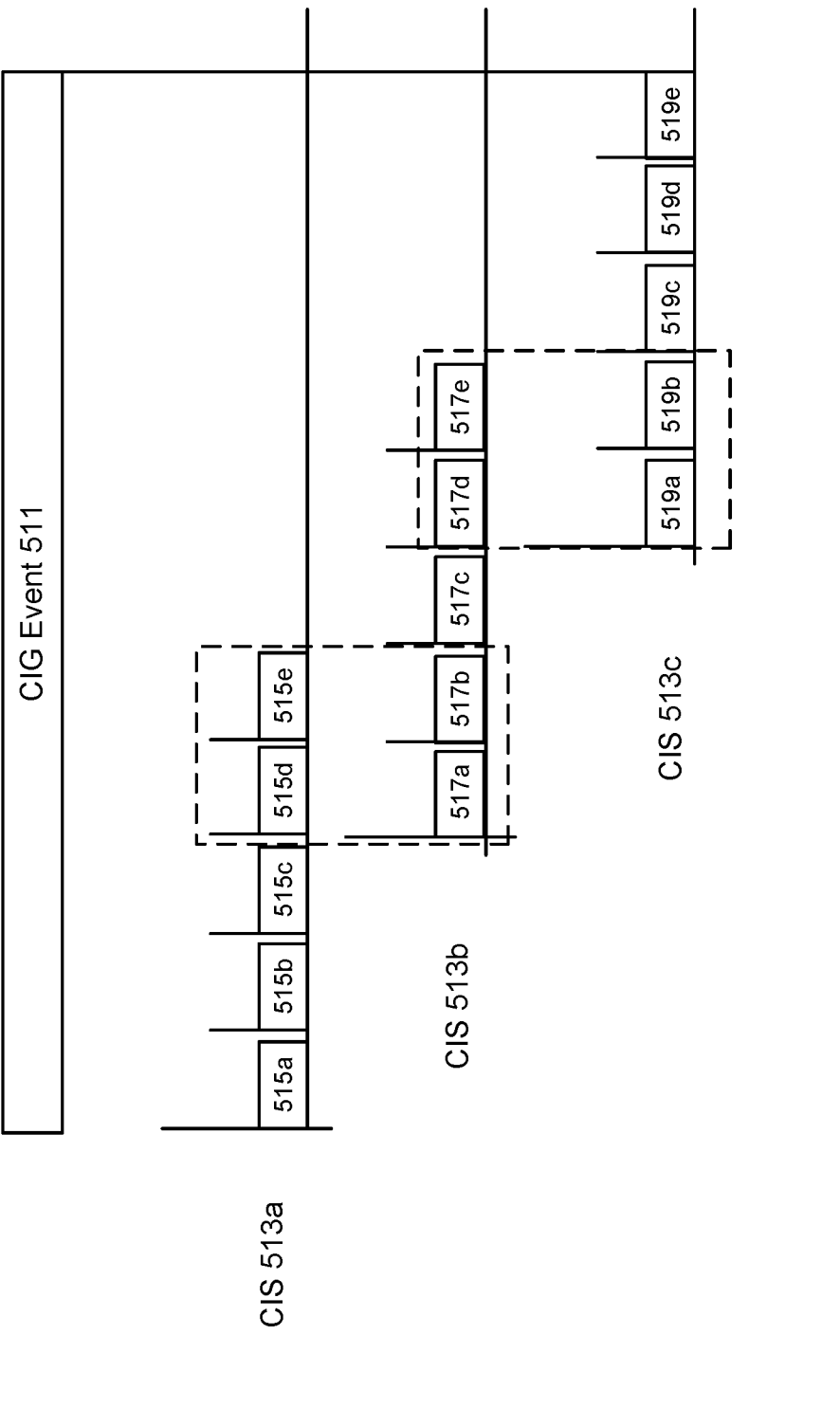

FIG. 5B is a diagram illustrating an example 510 associated with sharing subevents between isochronous streams, in accordance with the present disclosure. As shown in FIG. 5B, example 510 includes a CIG event 511 that includes eleven subevents. For example, an NSE variable associated with each CIS stream may be set to five. Although described in connection with eleven total subevents, the description similarly applies to fewer subevents (e.g., ten subevents, nine subevents, and so on) or additional subevents (e.g., twelve subevents, thirteen subevents, and so on). Furthermore, although described in connection with all of the CIS streams having an equal quantity of subevents, the description similarly applies to two or more of the CIS steams having different quantities of subevents.

As shown in FIG. 5B, the first CIS 513*a* is associated with subevent 515*a*, subevent 515*b*, subevent 515*c*, subevent 515*d*, and subevent 505*e*. In example 510, subevents 515*a*, 515*b*, and 515*c* are within a portion of the CIG event 501 that is not shared with the second CIS 513*b* or the third CIS 513*c*. Accordingly, an initiator device (e.g., initiator 110) may transmit a PDU to a first acceptor device (e.g., acceptor 120*a*) using the first CIS 513*a* during subevent 515*a*, subevent 515*b*, or subevent 515*c*.

Similarly, the second CIS 513*b* is associated with subevent 517*a*, subevent 517*b*, subevent 517*c*, subevent 517*d*, and subevent 517*e*. In example 510, subevent 517*c* is within a portion of the CIG event 511 that is not shared with the first CIS 513*a* or the third CIS 513*c*. Accordingly, the initiator 110 may transmit a PDU to a second acceptor device (e.g., acceptor 120*b*) using the second CIS 513*b* during the subevent 517*c*.

Similarly, the third CIS 513*c* is associated with subevent 519*a*, subevent 519*b*, subevent 519*c*, subevent 519*d*, and subevent 519*e*. In example 510, subevents 519*c*, 519*d*, and 519*e* are within a portion of the CIG event 511 that is not shared with the first CIS 513*a* or the second CIS 513*b*. Accordingly, the initiator 110 may transmit a PDU to a third acceptor device (e.g., acceptor 120*c*) using the third CIS 513*c* during subevent 519*c*, subevent 519*d*, or subevent 519*e*.

As further shown in FIG. 5B, subevents 515*d* and 515*e* for the first CIS 513*a* and subevents 517*a* and 517*b* for the second CIS 513*b* are within a portion of the CIG event 511 that is shared between the first CIS 513*a* and the second CIS 513*b*. Accordingly, the initiator 110 may transmit a PDU to the first acceptor 120*a* using the first CIS 513*a* or a PDU to the second acceptor 120*b* using the second CIS 513*b* during the subevent 515*d*/517*a* or the subevent 515*e*/517*b*.

Similarly, subevents 517*d* and 517*e* for the second CIS 513*b* and subevents 519*a* and 519*b* for the third CIS 513*c* are within a portion of the CIG event 511 that is shared between the second CIS 513*b* and the third CIS 513*c*. Accordingly, the initiator 110 may transmit a PDU to the second acceptor 120*b* using the second CIS 513*b* or a PDU to the third acceptor 120*c* using the third CIS 513*c* during the subevent 517*d*/519*a* or the subevent 517*e*/519*b*.

Although described using subevents shared between the first CIS 513*a* and the second CIS 513*b* and subevents shared between the second CIS 513*b* and the third CIS 513*c*, the description additionally or alternatively applies to subevents shared between the first CIS 513*a* and the third CIS 513*c* and/or subevents shared between the first CIS 513*a*, the second CIS 513*b*, and the third CIS 513*c*.

Figure 5C:
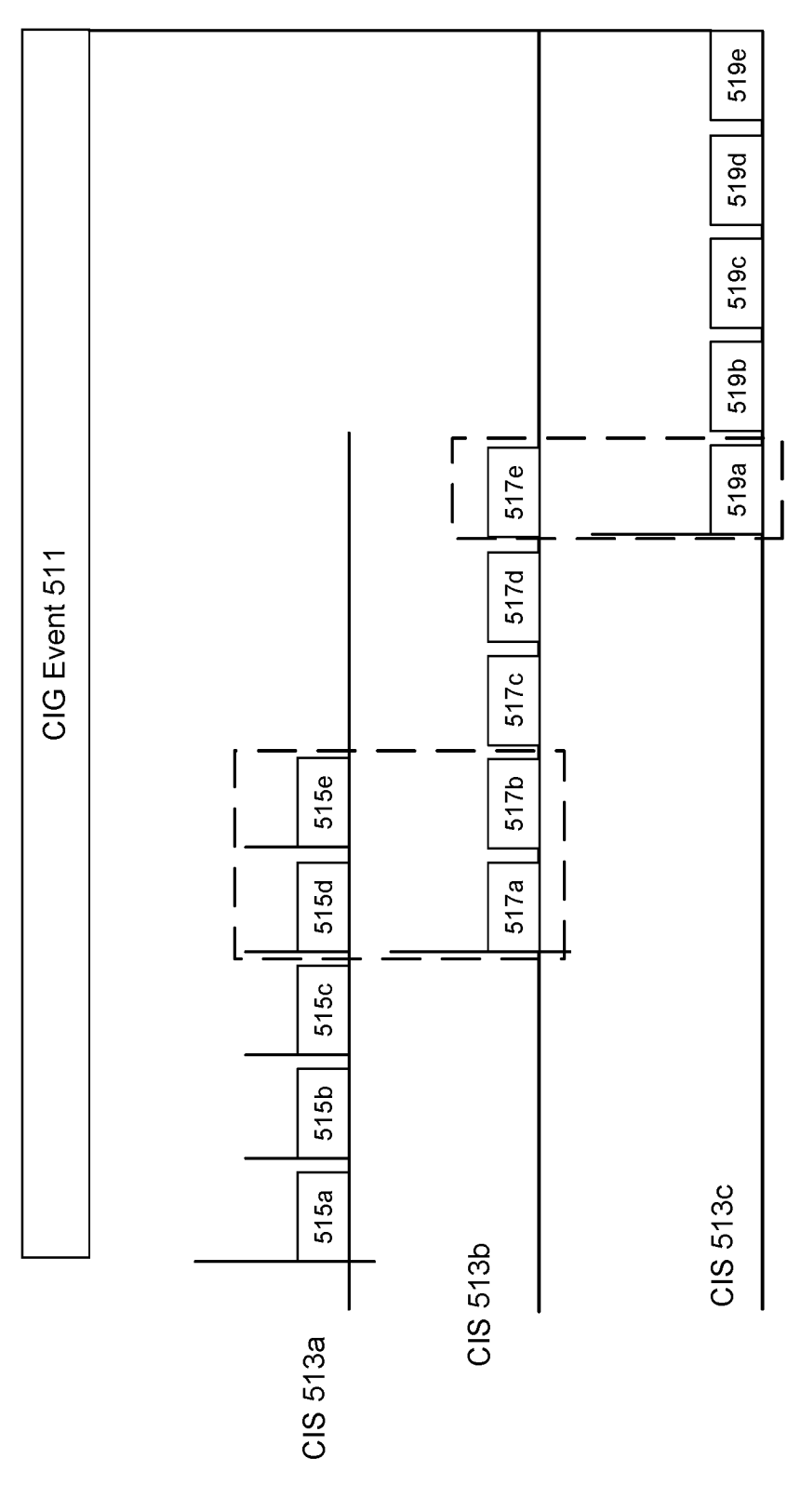

FIG. 5C is a diagram illustrating an example 520 associated with sharing subevents between isochronous streams, in accordance with the present disclosure. Example 520 is similar to example 510 except that the second CIS 513*b* and the third CIS 513*c* share a different quantity of subevents as compared with the first CIS 513*a* and the second CIS 513*b*. In example 520, the second CIS 513*b* and the third CIS 513*c* share one subevent 517*e*/519*a* while the first CIS 513*a* and the second CIS 513*b* share two subevents 515*d*/517*a* and 515*e*/517*b*. Other examples may include additional subevents shared between the second CIS 513*b* and the third CIS 513*c*, additional subevents shared between the first CIS 513*a* and the second CIS 513*b*, or one subevent shared between the first CIS 513*a* and the second CIS 513*b*.

In examples 510 and 520, the initiator 110 may schedule PDUs in shared subevents similarly as described above in connection with two CISs for example 500. Although described using two or three CISs, the description similarly applies to additional CISs (e.g., four CISs, five CISs, and so on) that at least partially overlap within a CIG event. Additionally, although described using CISs included in a CIG, the description similarly applies to CISs that are not explicitly included in a CIG.

Figure 5D:
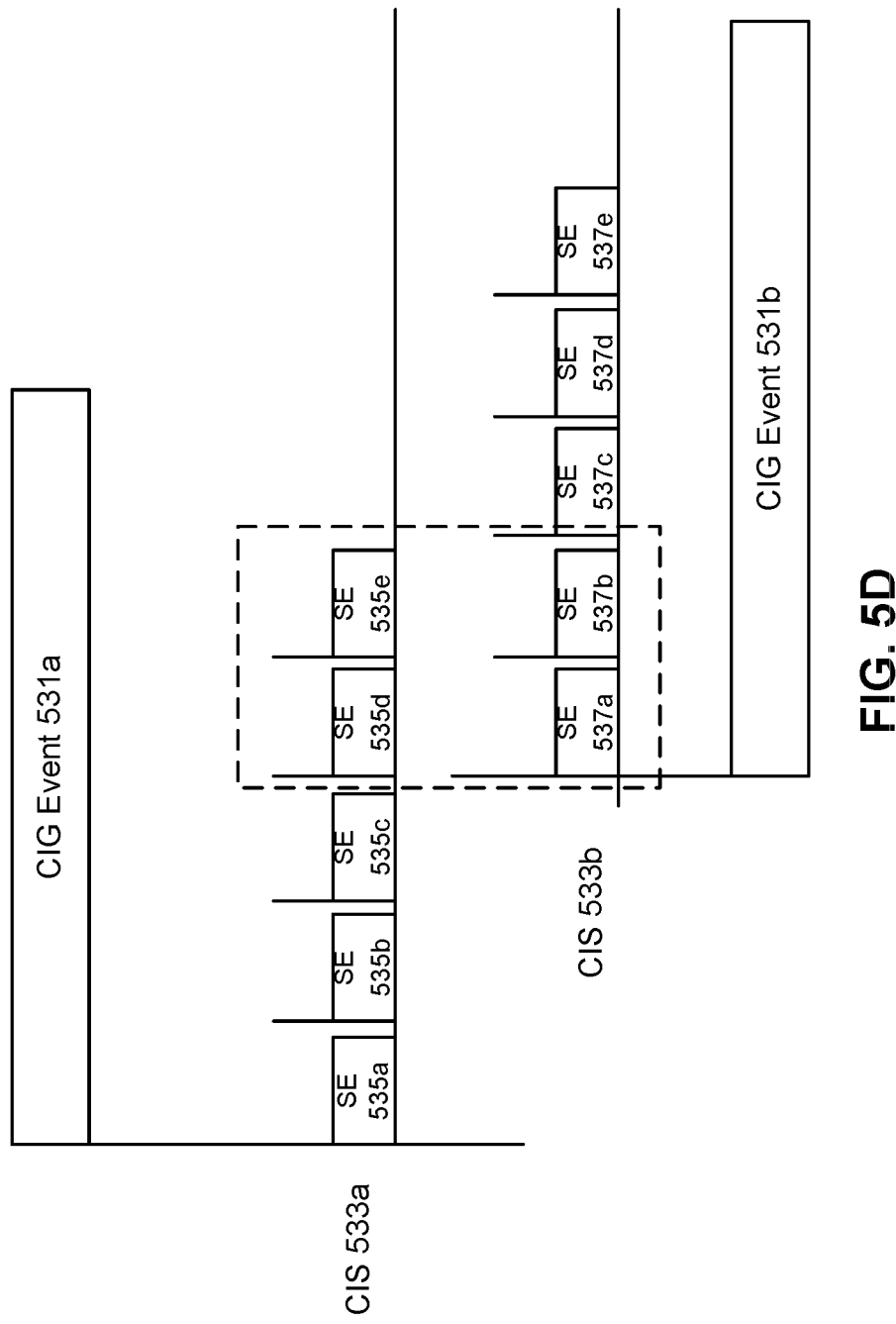

FIG. 5D is a diagram illustrating an example 530 associated with sharing subevents between isochronous streams, in accordance with the present disclosure. Example 530 is similar to example 500 except that the first CIS 533*a* and the second CIS 533*b* are associated with different CIG events (e.g., CIG event 531*a* and CIG event 531*b*, respectively). In example 530, the first CIS 533*a* and the second CIS 532*b* share two subevents 535*d*/537*a* and 535*e*/537*b* while the first CIS 533*a* and the second CIS 533*b*. Other examples may include additional subevents shared between the first CIS 533*a* and the second CIS 533*b* or one subevent shared between the first CIS 533*a* and the second CIS 533*b*. Accordingly, the CISs may be associated with different CIGs and/or different acceptor devices but still include shared subevents as long as the CIGs are associated with a same initiator device.

By using techniques as described in connection with FIGS. 5A-5D, one or more subevents within an event (e.g., a CIG event) are shared between two or more streams (e.g., CISs). As a result, bandwidth for the CISs is used more compactly, which allows other devices (e.g., WiFi devices or other contention-based protocol devices) to make use of unoccupied bandwidth for the CISs more effectively. Accordingly, latency is reduced for the other devices, and power and processing resources are conserved at the other devices. Furthermore, because the subevents may be shared without modifying behavior of acceptor devices, an initiator device may improve bandwidth use without software and hardware changes at the acceptor devices.

As indicated above, FIGS. 5A-5D are provided as examples. Other examples may differ from what is described with respect to FIGS. 5A-5D.

Figure 6A:
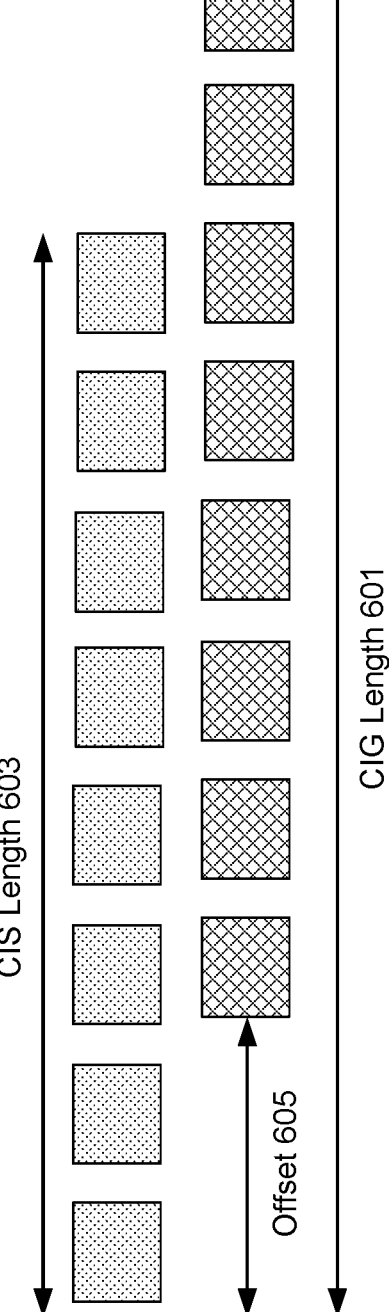
FIGS. 6A and 6B are diagrams illustrating examples associated with configuring shared subevents between isochronous streams, in accordance with the present disclosure.

FIG. 6A is a diagram illustrating an example 600 associated with configuring shared subevents between isochronous streams, in accordance with the present disclosure. As shown in FIG. 6A, example 600 includes a CIG event with a length 601 of ten subevents. Furthermore, the CIG includes at least two CISs, where each CIS has a length 603 of eight subevents. Accordingly, to configure an amount of overlap between the CISs (e.g., as described in connection with FIGS. 5A-5C), an initiator device (e.g., initiator 110) may use an offset 605. In example 600, the offset 605 is two subevents, such that each CIS includes two subevents that are not shared with the other CIS.

Figure 6B:
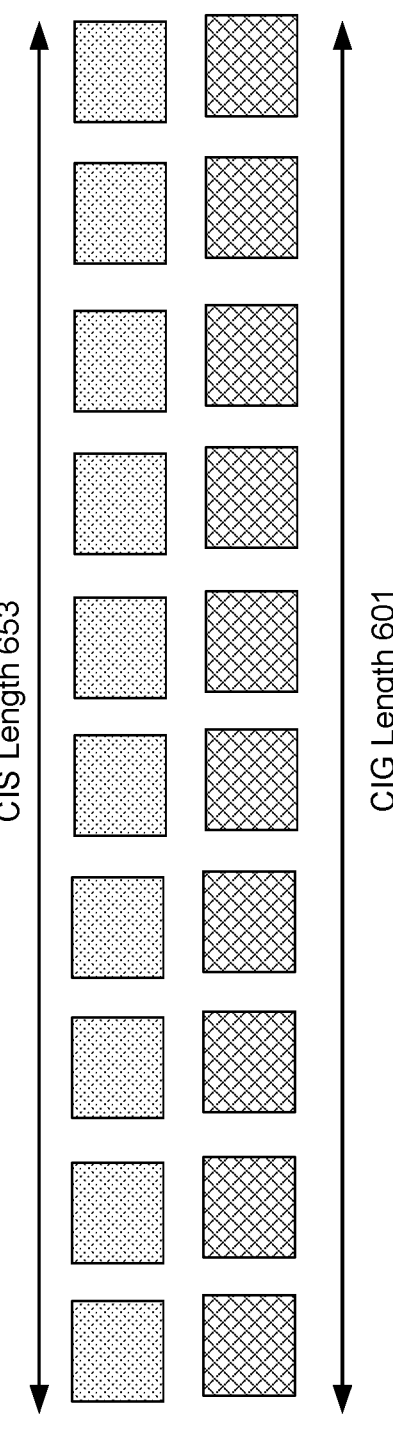

FIG. 6B is a diagram illustrating an example 650 associated with configuring shared subevents between isochronous streams, in accordance with the present disclosure. Example 650 is similar to example 600 but includes an offset of zero. Accordingly, all subevents within the CIG event are shared such that each CIS has a length 653 of ten subevents (that is, equal to the length 601 of the CIG event).

As indicated above, FIGS. 6A-6B are provided as examples. Other examples may differ from what is described with respect to FIGS. 6A-6B.

Figure 7:
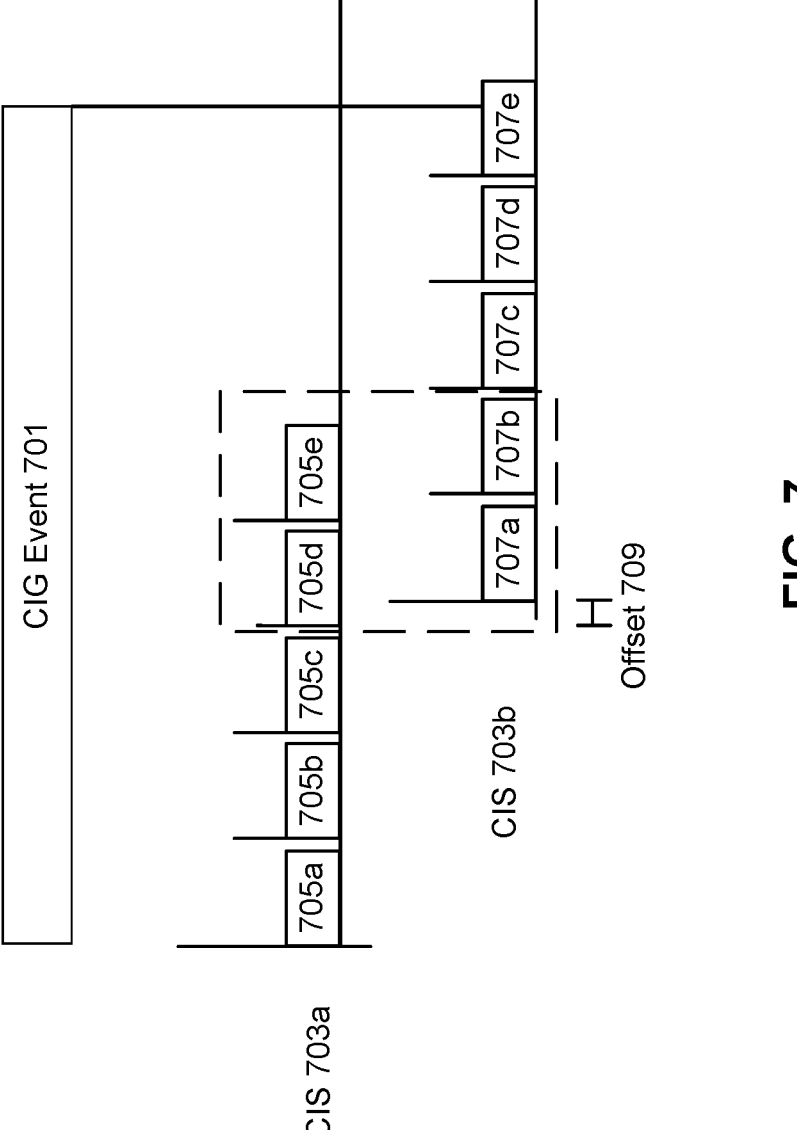
FIG. 7 is a diagram illustrating an example associated with time offsets within shared subevents between isochronous streams, in accordance with the present disclosure.

FIG. 7 is a diagram illustrating an example 700 associated with a PDU structure for isochronous streams, in accordance with the present disclosure. As shown in FIG. 7, example 700 includes a CIG event 701 that includes eight subevents. For example, an NSE variable associated with each CIS stream may be set to five. Although described in connection with eight total subevents, the description similarly applies to fewer subevents (e.g., seven subevents, six subevents, and so on) or additional subevents (e.g., nine subevents, ten subevents, and so on). Furthermore, although described in connection with both CIS streams having an equal quantity of subevents, the description similarly applies to the CIS steams having different quantities of subevents.

As shown in FIG. 7, the first CIS 703a is associated with subevent 705a, subevent 705b, subevent 705c, subevent 705d, and subevent 705e. Similar to example 500, subevents 705a, 705b, and 705c in example 700 are within a portion of the CIG event 701 that is not shared with the second CIS 703b. Accordingly, an initiator device (e.g., initiator 110) may transmit a PDU to a first acceptor device (e.g., acceptor 120a) using the first CIS 703a during subevent 705a, subevent 705b, or subevent 705c.

Similarly, the second CIS 703b is associated with subevent 707a, subevent 707b, subevent 707c, subevent 707d, and subevent 707e. Similar to example 500, subevents 707c, 707d, and 707e in example 700 are within a portion of the CIG event 701 that is not shared with the first CIS 703a. Accordingly, the initiator 110 may transmit a PDU to a second acceptor device (e.g., acceptor 120b) using the second CIS 703b during subevent 707c, subevent 707d, or subevent 707e.

Although described using two acceptor devices, the first CIS 703a and the second CIS 703b may be associated with a same acceptor device (e.g., a headset device using the first CIS 703a for a left earbud and the second CIS 703b for a right earbud).

As further shown in FIG. 7, subevents 705d and 705e for the first CIS 703a and subevents 707a and 707b for the second CIS 703b are within a portion of the CIG event 701 that is shared between the first CIS 703a and the second CIS 703b. Accordingly, the initiator 110 may transmit a PDU to the first acceptor 120a using the first CIS 703a during the subevent 705d or the subevent 705e. Alternatively, the initiator 110 may transmit a PDU to the second acceptor 120b using the second CIS 703b during the subevent 707a or the subevent 707b. When transmitting using the second CIS 703b, the initiator 110 applies an offset 709 (e.g., determined in microseconds (μs)) relative to when transmitting using the first CIS 703a. Accordingly, PDUs for the second CIS 703b may begin later within a shared subevent as compared with PDUs for the first CIS 703a. The initiator 110 may schedule PDUs in shared subevents as described in connection with FIGS. 5A-5C.

The offset 709 may allow for the initiator 110 to perform switching from the first CIS 703a to the second CIS 703b (or, in some implementations, from the second CIS 703b to the first CIS 703a). For example, the initiator 110 may wait to receive an ACK PDU (or a NACK PDU) for a PDU transmitted using the first CIS 703a before deciding whether to use the subevent 705d for the first CIS 703a or the subevent 707a for the second CIS 703b. Accordingly, the initiator 110 may use the offset 709 to apply changes to hardware (e.g., an antenna, a demodulator, and/or another similar type of hardware) for transmitting using the second CIS 703b rather than using the first CIS 703a after receiving an ACK PDU associated with the first CIS 703a. Alternatively, as described in connection with FIG. 9, a same acceptor device listening to both the first CIS 703a and the second CIS 703b may use the offset 709 to apply changes to hardware (e.g., an antenna, a demodulator, and/or another similar type of hardware) for listening to the second CIS 703b at the beginning of the subevent 707a when no PDU was received using the first CIS 703a at the beginning of the subevent 705d.

Although described in connection with some subevents not being shared, the description similarly applies to a CIG event in which all subevents are shared between the first CIS and the second CIS (e.g., as described in connection with FIG. 6B). Additionally, or alternatively, although described using two CISs, the description similarly applies to additional CISs (e.g., three CISs, four CISs, and so on) that share subevents within CIG events. For example, PDUs for a third CIS may be further offset in time relative to PDUs for the first CIS and PDUs for the second CIS. Alternatively, PDUs for the third CIS may be aligned with PDUs for the second CIS but still offset from PDUs for the first CIS or may be aligned with PDUs for the first CIS and thus offset from PDUs for the second CIS. Additionally, although described using CISs included in a CIG, the description similarly applies to CISs that are not explicitly included in a CIG.

As indicated above, FIG. 7 is provided as an example. Other examples may differ from what is described with respect to FIG. 7.

Figure 8A:
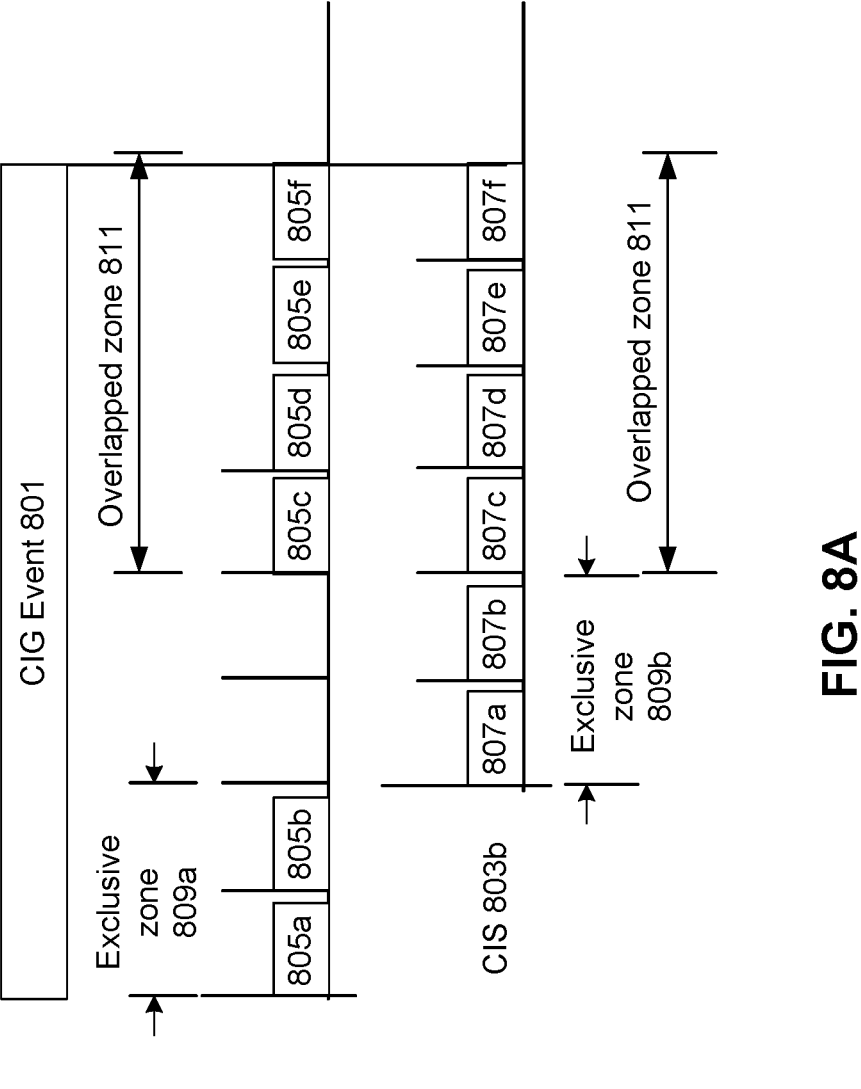
FIGS. 8A and 8B are diagrams illustrating examples associated with power saving during shared subevents between isochronous streams, in accordance with the present disclosure.

FIG. 8A is a diagram illustrating an example 800 associated with power saving during shared subevents between isochronous streams, in accordance with the present disclosure. As shown in FIG. 8A, example 800 includes a CIG event 801 that includes eight subevents. Additionally, as described in connection with FIG. 6B, all of the subevents are shared between a first CIS 803a and a second CIS 803b. Although described in connection with eight total subevents, the description similarly applies to fewer subevents (e.g., seven subevents, six subevents, and so on) or additional subevents (e.g., nine subevents, ten subevents, and so on). Furthermore, although described in connection with both CIS streams having an equal quantity of subevents, the description similarly applies to the CIS steams having different quantities of subevents.

As shown in FIG. 8A, a first acceptor device (e.g., acceptor 120a) associated with the first CIS 803a may be aware that the shared subevents are divided into an exclusive zone 809a associated with the first CIS 803a, an exclusive zone 809b associated with the second CIS 803b, and an overlapped zone 811 shared by the first CIS 803a and the second CIS 803b. For example, the acceptor 120a and the initiator 110 may use a shared formula (or other algorithm) to determine the exclusive zones 809a and 809b. Alternatively, the initiator 110 may transmit a control PDU to the acceptor 120a to indicate the exclusive zones 809a and 809b. Accordingly, even though all of the subevents are shared between the first CIS 803a and the second CIS 803b, the acceptor 120a may activate a low-power mode (e.g., by reducing a clocking speed of a processor and/or another hardware component and/or by powering off an antenna and/or another hardware component) during subevents 807a and 807b within the exclusive zone 809b. The acceptor 120a therefore listens for PDUs associated with the CIS 803a during the subevents 805a and 805b in the exclusive zone 809a as well as during the subevents 805c, 805d, 805e, and 805f in the overlapped zone 811. The initiator 110 may schedule PDUs in the overlapped zone 811 as described in connection with FIGS. 5A-5C.

Similarly, a second acceptor device (e.g., acceptor 120b) associated with the second CIS 803b may be aware that the shared subevents are divided into the exclusive zone 809a associated with the first CIS 803a, the exclusive zone 809b associated with the second CIS 803b, and the overlapped zone 811 shared by the first CIS 803a and the second CIS 803b. For example, the acceptor 120b and the initiator 110 may use a shared formula (or other algorithm) to determine the exclusive zones 809a and 809b. Alternatively, the initiator 110 may transmit a control PDU to the acceptor 120*b* to indicate the exclusive zones 809*a* and 809*b*. Accordingly, even though all of the subevents are shared between the first CIS 803*a* and the second CIS 803*b*, the acceptor 120*b* may activate a low-power mode during subevents 805*a* and 805*b* within the exclusive zone 809*a*. The acceptor 120*b* therefore listens for PDUs associated with the CIS 803*b* during the subevents 807*a* and 807*b* in the exclusive zone 809*b* as well as during the subevents 807*c*, 807*d*, 807*e*, and 807*f* in the overlapped zone 811. The initiator 110 may schedule PDUs in the overlapped zone 811 as described in connection with FIGS. 5A-5C.

Figure 8B:
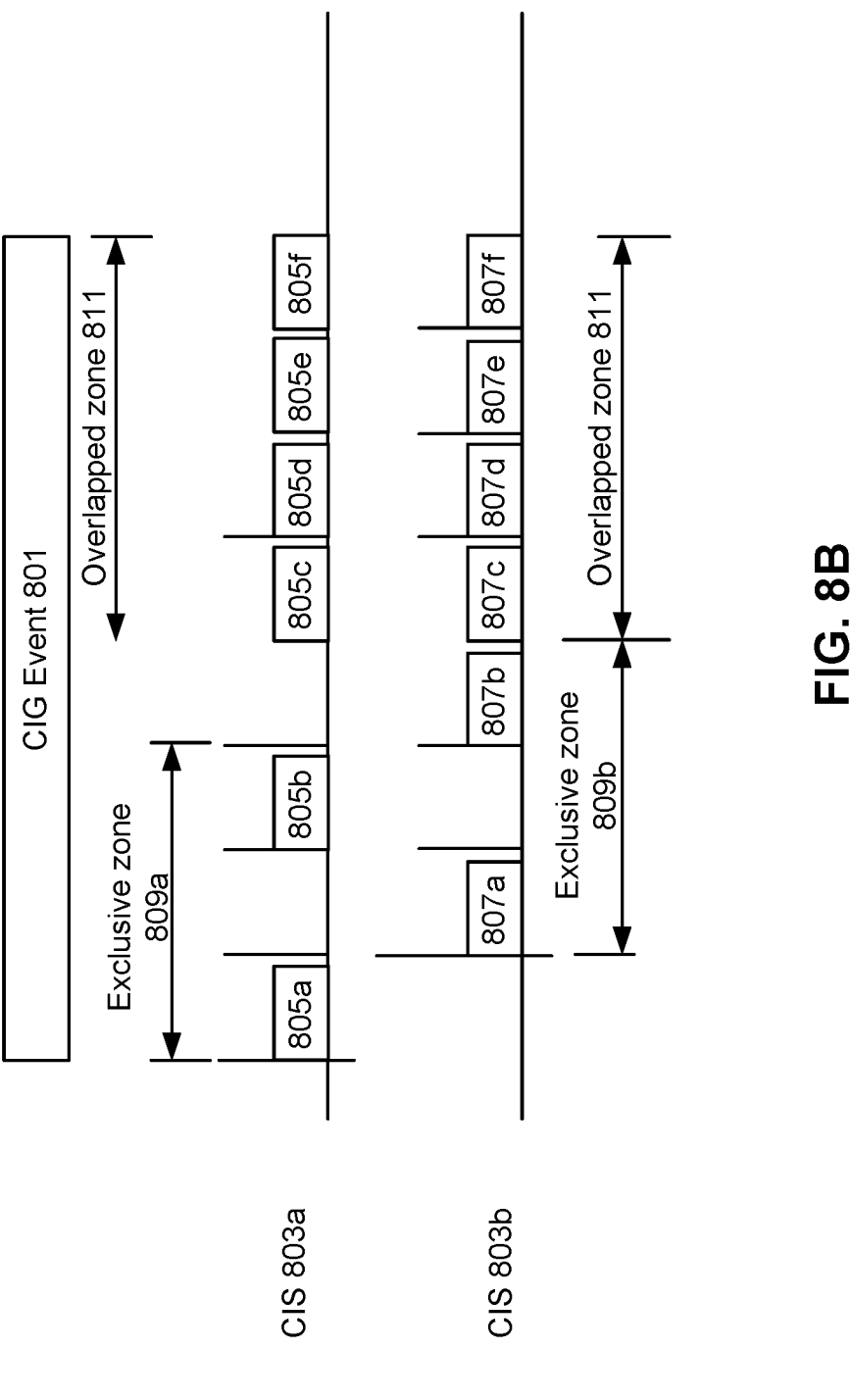

In example 800, subevents 805*a* and 805*b* associated with the first CIS 803*a* are sequential relative to subevents 807*a* and 807*b* associated with the second CIS 803*b*. FIG. 8B is a diagram illustrating an example 850 associated with power saving during shared subevents between isochronous streams, in accordance with the present disclosure. Example 850 is similar to example 800, but subevents 805*a* and 805*b* associated with the first CIS 803*a* are interleaved with subevents 807*a* and 807*b* associated with the second CIS 803*b*.

Although described using two acceptor devices, the CISs may be associated with a same acceptor device (e.g., a headset device using the first CIS 803*a* for a left earbud and the second CIS 803*b* for a right earbud). Additionally, although described using CISs included in a CIG, the description similarly applies to CISs that are not explicitly included in a CIG.

As indicated above, FIGS. 8A-8B are provided as examples. Other examples may differ from what is described with respect to FIGS. 8A-8B.

Figure 9:
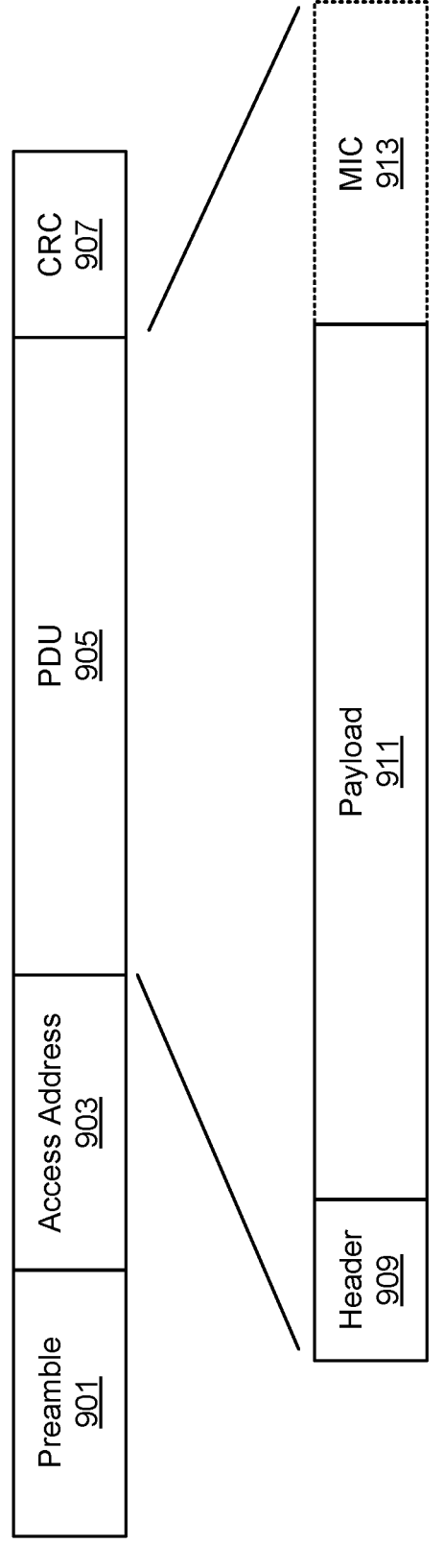
FIG. 9 is a diagram illustrating an example associated with a protocol data unit (PDU) structure for isochronous streams, in accordance with the present disclosure.

FIG. 9 is a diagram illustrating an example 900 associated with a PDU structure for isochronous streams, in accordance with the present disclosure. As shown in FIG. 9, an initiator device (e.g., initiator 110) may transmit (e.g., to an acceptor device, such as acceptor 120) a signal encoding a data structure with a preamble 901 (e.g., including one or two octets), an access address 903 (e.g., four octets), an isochronous PDU 905 (e.g., between two octets and 257 octets or, in another example, between two octets and 1026 octets), and a cyclic redundancy check (CRC) 907 (e.g., three octets). As further shown in FIG. 9, the isochronous PDU 905 may include a header 909 (e.g., sixteen bits) and a payload 911 (e.g., between zero octets, for a null PDU, and 251 octets, for a payload such as a digitally encoded audio signal). In some aspects, the isochronous PDU 905 may include a message integrity check (MIC) 913 (e.g., 32 bits).

Generally, each CIS is associated with a unique access address. Accordingly, the initiator 110 may transmit a PDU during a shared subevent (e.g., as described herein) and indicate for which CIS the PDU is intended by encoding the access address associated with that CIS in the data structure for the PDU.

In some aspects, shared subevents may be explicitly (e.g., as indicated by the initiator 110) or implicitly (e.g., by a rule, such as when (SE number) % (number of CISs)=0) associated with different CISs. For example, a first shared subevent may be associated with a first CIS, a second shared subevent may be associated with a second CIS, and so on. In another example, a first set of shared subevents may be associated with the first CIS, a second, subsequent set of subevents may be associated with the second CIS, and so on. Accordingly, the initiator 110 may assign to the first CIS a secondary access address (different than a primary access address associated with the first CIS and a primary access address associated with the second CIS) that indicates when a PDU is being transmitted to the first CIS in a shared subevent that is not associated with the first CIS. Similarly, the initiator 110 may assign to the second CIS a secondary access address (different than a primary access address associated with the first CIS and a primary access address associated with the second CIS) that indicates when a PDU is being transmitted to the second CIS in a shared subevent that is not associated with the second CIS.

Additionally, or alternatively, the first CIS and the second CIS may share an access address. Accordingly, an acceptor may determine that a PDU, transmitted in a shared subevent, is intended for that acceptor when the shared subevent is associated with the CIS for the acceptor (and the PDU includes the shared access address) or when the PDU includes the secondary access address for the CIS rather than the shared access address (e.g., as described above). Additionally, or alternatively, the acceptor may determine that a PDU, transmitted in a shared subevent, is intended for that acceptor based on one or more additional bits included in the header 909. In an example with two CISs, one additional bit may be set to '1' when the PDU is for the first CIS and to '0' when the PDU is for the second CIS. In an example with four CISs, two additional bits may indicate the CIS (e.g., by using '00' for the first CIS, '01' for the second CIS, '10' for the third CIS, and '11' for the fourth CIS). Additionally, or alternatively, the initiator 110 may use the MIC 913 to indicate for which CIS the PDU is intended. Accordingly, the acceptor may determine that a PDU, transmitted in a shared subevent, is intended for that acceptor based on the PDU passing the MIC test.

Additionally, or alternatively, the initiator 110 may associate PDUs intended for a second CIS with a time offset relative to PDUs intended for a first CIS. For example, as described in connection with FIG. 7, a PDU intended for the second CIS may be transmitted later in time during a shared subevent as compared with when a PDU intended for the first CIS would be transmitted during the same shared subevent.

Although described using two CISs, the description similarly applies to additional CISs (e.g., three CISs, four CISs, and so on) that share subevents within CIG events. Other aspects may be used only for two CISs. For example, the initiator 110 may associate a first CIS with a CRC and a second CIS with an inversion of the CRC. Accordingly, the acceptor may determine that a PDU, transmitted in a shared subevent, is intended for that acceptor based on whether the CRC is inverted or not. Additionally, although described using CISs included in a CIG, the description similarly applies to CISs that are not explicitly included in a CIG.

In some aspects (e.g., for a headset device as acceptor device), both CISs may be used by the same acceptor device as compared with, for example, earbuds for which the CISs are used by different acceptor devices. For the single acceptor device, the same access address may be used for both CISs, as described above, with the CISs differentiated using one or more techniques as described herein. Additionally, the single acceptor device may use an offset, as described in connection with FIG. 7, to allow a same hardware component (e.g., a same antenna, a same demodulator, and/or another similar type of hardware) to listen for both CISs using the offset.

As indicated above, FIG. 9 is provided as an example. Other examples may differ from what is described with respect to FIG. 9.

Figure 10:
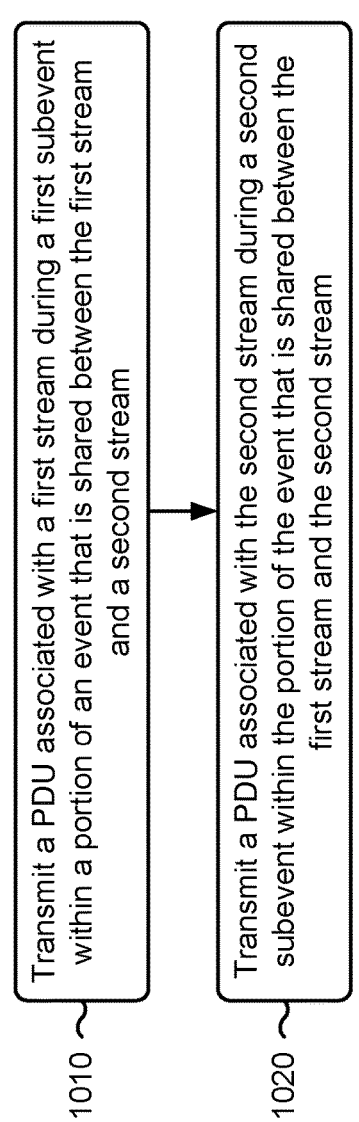
FIGS. 10 and 11 are diagrams illustrating example processes associated with using shared subevents for PDUs associated with different streams, in accordance with the present disclosure.

FIG. 10 is a diagram illustrating an example process 1000 performed, for example, by an initiator device, in accordance with the present disclosure. Example process 1000 is an example where the initiator device (e.g., initiator device 110 and/or apparatus 1200 of FIG. 12) performs operations associated with using shared subevents for PDU associated with different streams.

As shown in FIG. 10, in some aspects, process 1000 may include transmitting a PDU associated with a first stream during a first subevent within a portion of an event that is shared between the first stream and a second stream (block 1010). For example, the initiator device (e.g., using communication manager 150 and/or transmission component 1204, depicted in FIG. 12) may transmit a PDU associated with a first stream during a first subevent within a portion of an event that is shared between the first stream and a second stream, as described herein.

Additionally, or alternatively, and as further shown in FIG. 10, process 1000 may include transmitting a PDU associated with the second stream during a second subevent within the portion of the event that is shared between the first stream and the second stream (block 1020). For example, the initiator device (e.g., using communication manager 150 and/or transmission component 1204) may transmit a PDU associated with the second stream during a second subevent within the portion of the event that is shared between the first stream and the second stream, as described herein.

Process 1000 may include additional aspects, such as any single aspect or any combination of aspects described below and/or in connection with one or more other processes described elsewhere herein.

In a first aspect, the first stream includes a first CIS within a CIG, and the second stream includes a second CIS within the CIG.

In a second aspect, alone or in combination with the first aspect, process 1000 further includes transmitting (e.g., using communication manager 150 and/or transmission component 1204) a PDU associated with a third stream during a third subevent within a portion of the event that is shared between the third stream and at least one of the first stream or the second stream.

In a third aspect, alone or in combination with one or more of the first and second aspects, process 1000 further includes transmitting (e.g., using communication manager 150 and/or transmission component 1204) a PDU associated with the first stream during a third subevent within a portion of the event that is not shared with the second stream.

In a fourth aspect, alone or in combination with one or more of the first through third aspects, process 1000 further includes transmitting (e.g., using communication manager 150 and/or transmission component 1204) a PDU associated with the second stream during a third subevent within a portion of the event that is not shared with the first stream.

In a fifth aspect, alone or in combination with one or more of the first through fourth aspects, at least one of the first subevent or the second subevent is shifted in time when used for the second stream relative to when used for the first stream.

In a sixth aspect, alone or in combination with one or more of the first through fifth aspects, the portion of the event that is shared between the first stream and the second stream is based at least in part on an offset value.

Figure 12:
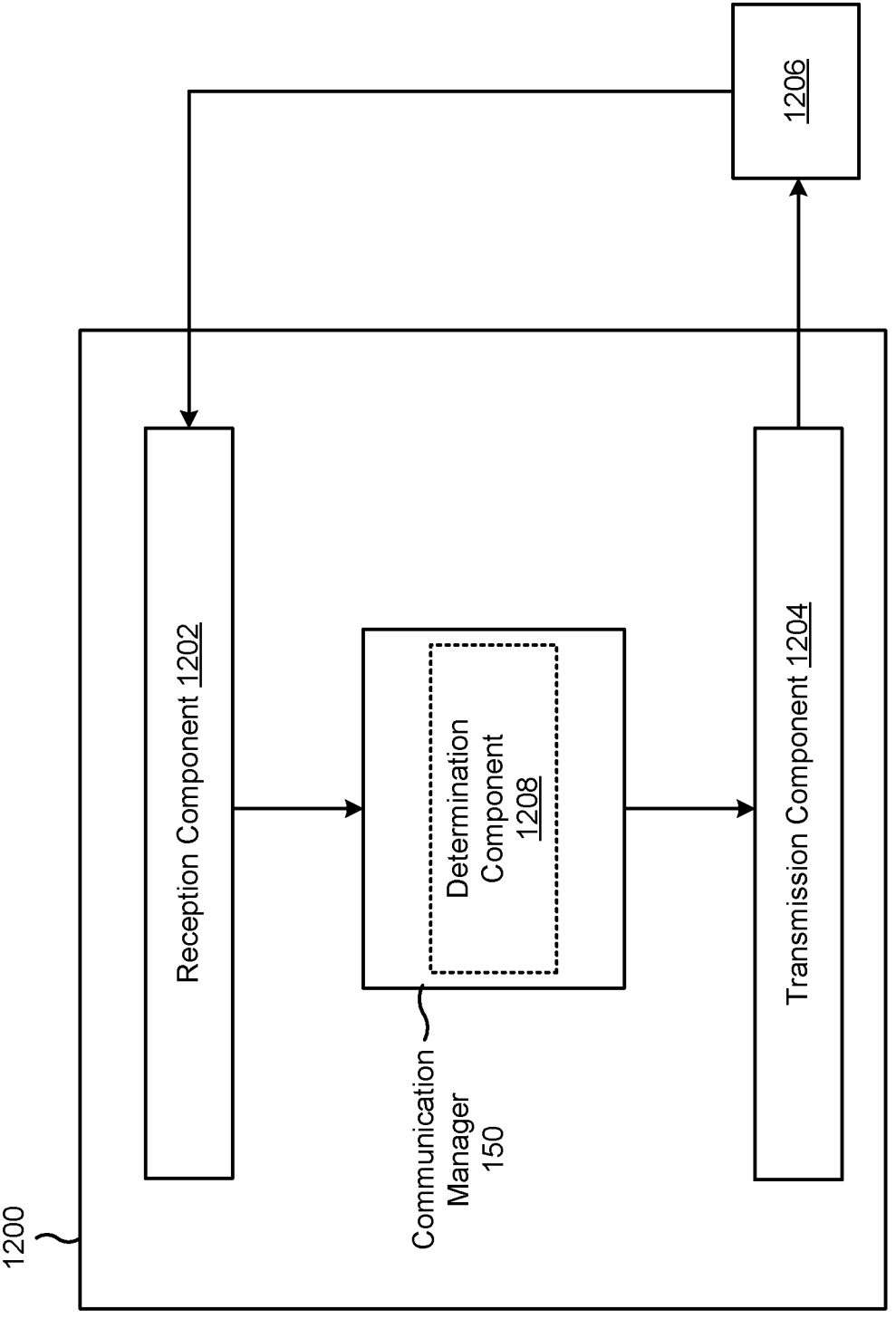
FIGS. 12 and 13 are diagrams of example apparatuses for wireless communication, in accordance with the present disclosure.

In a seventh aspect, alone or in combination with one or more of the first through sixth aspects, process 1000 further includes determining (e.g., using communication manager 150 and/or determination component 1208, depicted in FIG. 12) to transmit the PDU associated with the first stream based at least in part on a flush point associated with the PDU associated with the first stream.

In an eighth aspect, alone or in combination with one or more of the first through seventh aspects, process 1000 further includes determining (e.g., using communication manager 150 and/or determination component 1208) to transmit the PDU associated with the first stream based at least in part on a round robin schedule associated with at least the first stream and the second stream.

In a ninth aspect, alone or in combination with one or more of the first through eighth aspects, the first stream is associated with a first access address, and the second stream is associated with a second access address.

In a tenth aspect, alone or in combination with one or more of the first through ninth aspects, the first subevent is associated with the second stream, and the PDU associated with the first stream includes a third access address.

In an eleventh aspect, alone or in combination with one or more of the first through tenth aspects, the second subevent is associated with the first stream, and the PDU associated with the second stream includes a third access address.

In a twelfth aspect, alone or in combination with one or more of the first through eleventh aspects, the first stream and the second stream are associated with a same access address.

In a thirteenth aspect, alone or in combination with one or more of the first through twelfth aspects, the PDU associated with the second stream includes one or more bits in a header indicating that the PDU is for the second stream.

In a fourteenth aspect, alone or in combination with one or more of the first through thirteenth aspects, the PDU associated with the second stream is associated with an MIC to indicate that the PDU is for the second stream.

In a fifteenth aspect, alone or in combination with one or more of the first through fourteenth aspects, the PDU associated with the second stream is associated with an inverted CRC to indicate that the PDU is for the second stream.

In a sixteenth aspect, alone or in combination with one or more of the first through fifteenth aspects, the PDU associated with the second stream is associated with a time offset relative to the PDU associated with the second stream.

Although FIG. 10 shows example blocks of process 1000, in some aspects, process 1000 may include additional blocks, fewer blocks, different blocks, or differently arranged blocks than those depicted in FIG. 10. Additionally, or alternatively, two or more of the blocks of process 1000 may be performed in parallel.

Figure 11:
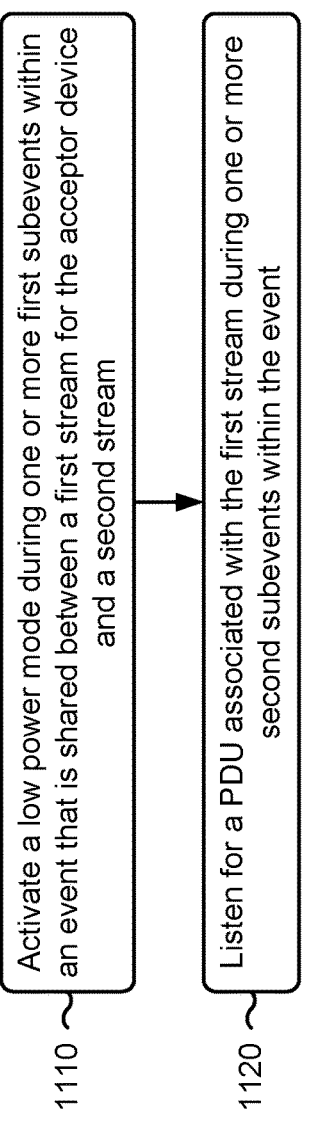

FIG. 11 is a diagram illustrating an example process 1100 performed, for example, by an acceptor device, in accordance with the present disclosure. Example process 1100 is an example where the acceptor device (e.g., acceptor device 120 and/or apparatus 1300 of FIG. 13) performs operations associated with using shared subevents for PDUs associated with different streams.

As shown in FIG. 11, in some aspects, process 1100 may include activating a low power mode during one or more first subevents within an event that is shared between a first stream for the acceptor device and a second stream (block 1110). For example, the acceptor device (e.g., using communication manager 140 and/or power management component 1308, depicted in FIG. 13) may activate a low power mode during one or more first subevents within an event that is shared between a first stream for the acceptor device and a second stream, as described herein.

As further shown in FIG. 11, in some aspects, process 1100 may include listening for a PDU associated with the first stream during one or more second subevents within the event (block 1120). For example, the acceptor device (e.g., using communication manager 140 and/or reception component 1302, depicted in FIG. 13) may listen for a PDU associated with the first stream during one or more second subevents within the event, as described herein.

Process 1100 may include additional aspects, such as any single aspect or any combination of aspects described below and/or in connection with one or more other processes described elsewhere herein.

In a first aspect, the first stream includes a first CIS within a CIG, and the second stream includes a second CIS within the CIG.

In a second aspect, alone or in combination with the first aspect, the one or more second subevents are associated with the acceptor device and are sequential relative to the one or more first subevents.

In a third aspect, alone or in combination with one or more of the first and second aspects, the one or more second subevents are associated with the acceptor device and are interleaved with the one or more first subevents.

In a fourth aspect, alone or in combination with one or more of the first through third aspects, the second stream is associated with the acceptor device.

In a fifth aspect, alone or in combination with one or more of the first through fourth aspects, the second stream is associated with an additional acceptor device.

Although FIG. 11 shows example blocks of process 1100, in some aspects, process 1100 may include additional blocks, fewer blocks, different blocks, or differently arranged blocks than those depicted in FIG. 11. Additionally, or alternatively, two or more of the blocks of process 1100 may be performed in parallel.

FIG. 12 is a diagram of an example apparatus 1200 for wireless communication. The apparatus 1200 may be an initiator device, or an initiator device may include the apparatus 1200. In some aspects, the apparatus 1200 includes a reception component 1202 and a transmission component 1204, which may be in communication with one another (for example, via one or more buses and/or one or more other components). As shown, the apparatus 1200 may communicate with another apparatus 1206 (such as an acceptor device or another wireless communication device) using the reception component 1202 and the transmission component 1204. As further shown, the apparatus 1200 may include the communication manager 150. The communication manager 150 may include a determination component 1208, among other examples.

In some aspects, the apparatus 1200 may be configured to perform one or more operations described herein in connection with FIGS. 5A, 5B, 5C, 6A, 6B, 7, 8A, 8B, and 9. Additionally, or alternatively, the apparatus 1200 may be configured to perform one or more processes described herein, such as process 1000 of FIG. 10, or a combination thereof. In some aspects, the apparatus 1200 and/or one or more components shown in FIG. 12 may include one or more components of the initiator device described in connection with FIG. 2. Additionally, or alternatively, one or more components shown in FIG. 12 may be implemented within one or more components described in connection with FIG. 2. Additionally, or alternatively, one or more components of the set of components may be implemented at least in part as software stored in a memory. For example, a component (or a portion of a component) may be implemented as instructions or code stored in a non-transitory computer-readable medium and executable by a controller or a processor to perform the functions or operations of the component.

The reception component 1202 may receive communications, such as reference signals, control information, data communications, or a combination thereof, from the apparatus 1206. The reception component 1202 may provide received communications to one or more other components of the apparatus 1200. In some aspects, the reception component 1202 may perform signal processing on the received communications (such as filtering, amplification, demodulation, analog-to-digital conversion, demultiplexing, deinterleaving, de-mapping, equalization, interference cancellation, or decoding, among other examples), and may provide the processed signals to the one or more other components of the apparatus 1200. In some aspects, the reception component 1202 may include one or more antennas, a modem, a demodulator, a MIMO detector, a receive processor, a controller/processor, a memory, or a combination thereof, of the initiator device described in connection with FIG. 2.

The transmission component 1204 may transmit communications, such as reference signals, control information, data communications, or a combination thereof, to the apparatus 1206. In some aspects, one or more other components of the apparatus 1200 may generate communications and may provide the generated communications to the transmission component 1204 for transmission to the apparatus 1206. In some aspects, the transmission component 1204 may perform signal processing on the generated communications (such as filtering, amplification, modulation, digital-to-analog conversion, multiplexing, interleaving, mapping, or encoding, among other examples), and may transmit the processed signals to the apparatus 1206. In some aspects, the transmission component 1204 may include one or more antennas, a modem, a modulator, a transmit MIMO processor, a transmit processor, a controller/processor, a memory, or a combination thereof, of the initiator device described in connection with FIG. 2. In some aspects, the transmission component 1204 may be co-located with the reception component 1202 in a transceiver.

In some aspects, the transmission component 1204 may transmit (e.g., to a first acceptor device) a PDU associated with a first stream during a first subevent within a portion of an event that is shared between the first stream and a second stream. Additionally, or alternatively, the transmission component 1204 may transmit (e.g., to a second acceptor device) a PDU associated with the second stream during a second subevent within the portion of the event that is shared between the first stream and the second stream.

In some aspects, the transmission component 1204 may additionally transmit (e.g., to a third acceptor device) a PDU associated with a third stream during a third subevent within a portion of the event that is shared between the third stream and at least one of the first stream or the second stream.

Additionally, or alternatively, the transmission component 1204 may transmit (e.g., to the first acceptor device) a PDU associated with the first stream during a third subevent within a portion of the event that is not shared with the second stream. Additionally, or alternatively, transmission component 1204 may transmit (e.g., to the second acceptor device) a PDU associated with the second stream during a third subevent within a portion of the event that is not shared with the first stream.

In some aspects, the determination component 1208 may determine to transmit the PDU associated with the first stream based at least in part on a flush point associated with the PDU associated with the first stream. Additionally, or alternatively, the determination component 1208 may determine to transmit the PDU associated with the first stream based at least in part on a round robin schedule associated with at least the first stream and the second stream. The determination component 1208 may include a transmit MIMO processor, a transmit processor, a controller/processor, a memory, or a combination thereof, of the initiator device described in connection with FIG. 2.

The number and arrangement of components shown in FIG. 12 are provided as an example. In practice, there may be additional components, fewer components, different components, or differently arranged components than those shown in FIG. 12. Furthermore, two or more components shown in FIG. 12 may be implemented within a single component, or a single component shown in FIG. 12 may be implemented as multiple, distributed components. Additionally, or alternatively, a set of (one or more) components shown in FIG. 12 may perform one or more functions described as being performed by another set of components shown in FIG. 12.

Figure 13:
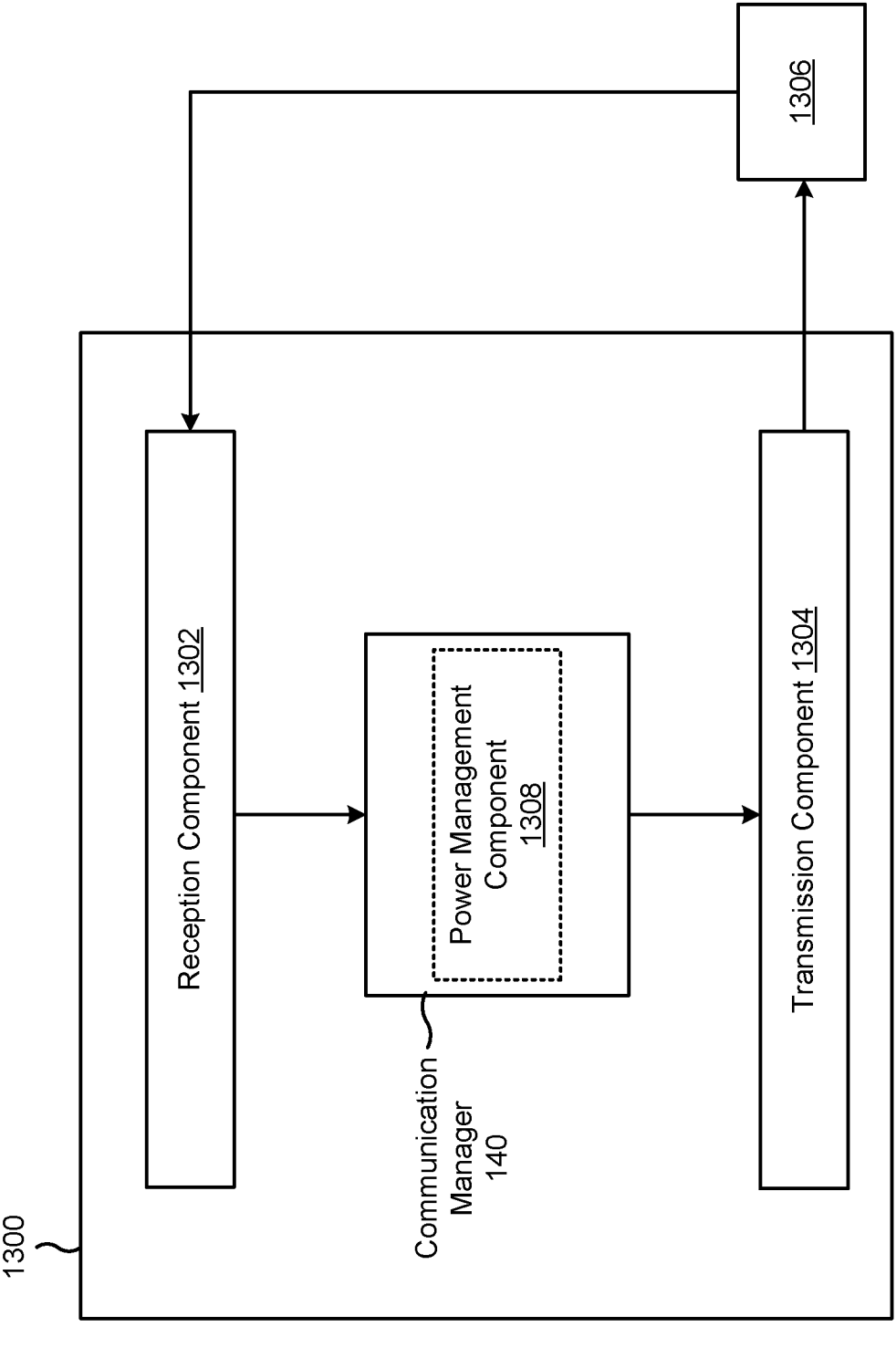

FIG. 13 is a diagram of an example apparatus 1300 for wireless communication. The apparatus 1300 may be an acceptor device, or an acceptor device may include the apparatus 1300. In some aspects, the apparatus 1300 includes a reception component 1302 and a transmission component 1304, which may be in communication with one another (for example, via one or more buses and/or one or more other components). As shown, the apparatus 1300 may communicate with another apparatus 1306 (such as an initiator device or another wireless communication device) using the reception component 1302 and the transmission component 1304. As further shown, the apparatus 1300 may include the communication manager 140. The communication manager 140 may include a power management component 1308, among other examples.

In some aspects, the apparatus 1300 may be configured to perform one or more operations described herein in connection with FIGS. 5A, 5B, 5C, 6A, 6B, 7, 8A, 8B, and 9. Additionally, or alternatively, the apparatus 1300 may be configured to perform one or more processes described herein, such as process 1100 of FIG. 11, or a combination thereof. In some aspects, the apparatus 1300 and/or one or more components shown in FIG. 13 may include one or more components of the acceptor device described in connection with FIG. 2. Additionally, or alternatively, one or more components shown in FIG. 13 may be implemented within one or more components described in connection with FIG. 2. Additionally, or alternatively, one or more components of the set of components may be implemented at least in part as software stored in a memory. For example, a component (or a portion of a component) may be implemented as instructions or code stored in a non-transitory computer-readable medium and executable by a controller or a processor to perform the functions or operations of the component.

The reception component 1302 may receive communications, such as reference signals, control information, data communications, or a combination thereof, from the apparatus 1306. The reception component 1302 may provide received communications to one or more other components of the apparatus 1300. In some aspects, the reception component 1302 may perform signal processing on the received communications (such as filtering, amplification, demodulation, analog-to-digital conversion, demultiplexing, deinterleaving, de-mapping, equalization, interference cancellation, or decoding, among other examples), and may provide the processed signals to the one or more other components of the apparatus 1300. In some aspects, the reception component 1302 may include one or more antennas, a modem, a demodulator, a MIMO detector, a receive processor, a controller/processor, a memory, or a combination thereof, of the acceptor device described in connection with FIG. 2.

The transmission component 1304 may transmit communications, such as reference signals, control information, data communications, or a combination thereof, to the apparatus 1306. In some aspects, one or more other components of the apparatus 1300 may generate communications and may provide the generated communications to the transmission component 1304 for transmission to the apparatus 1306. In some aspects, the transmission component 1304 may perform signal processing on the generated communications (such as filtering, amplification, modulation, digital-to-analog conversion, multiplexing, interleaving, mapping, or encoding, among other examples), and may transmit the processed signals to the apparatus 1306. In some aspects, the transmission component 1304 may include one or more antennas, a modem, a modulator, a transmit MIMO processor, a transmit processor, a controller/processor, a memory, or a combination thereof, of the acceptor device described in connection with FIG. 2. In some aspects, the transmission component 1304 may be co-located with the reception component 1302 in a transceiver.

In some aspects, the power management component 1308 may activate a low power mode during one or more first subevents within an event that is shared between a first stream for the apparatus 1300 and a second stream. The power management component 1308 may include a MIMO detector, a receive processor, a controller/processor, a memory, or a combination thereof, of the acceptor device described in connection with FIG. 2. The second stream may be associated with the apparatus 1300 or with an additional apparatus (e.g., an additional acceptor device). Additionally, the reception component 1302 may listen for a PDU associated with the first stream during one or more second subevents within the event.

The number and arrangement of components shown in FIG. 13 are provided as an example. In practice, there may be additional components, fewer components, different components, or differently arranged components than those shown in FIG. 13. Furthermore, two or more components shown in FIG. 13 may be implemented within a single component, or a single component shown in FIG. 13 may be implemented as multiple, distributed components. Additionally, or alternatively, a set of (one or more) components shown in FIG. 13 may perform one or more functions described as being performed by another set of components shown in FIG. 13.

The following provides an overview of some Aspects of the present disclosure:

Aspect 1: A method of wireless communication performed by an initiator device, comprising: transmitting a protocol data unit (PDU) associated with a first stream during a first subevent within a portion of an event that is shared between the first stream and a second stream; transmitting a PDU associated with the second stream during a second subevent within the portion of the event that is shared between the first stream and the second stream; or a combination thereof.

Aspect 2: The method of Aspect 1, wherein the first stream comprises a first connected isochronous stream (CIS) within a connected isochronous group (CIG), and the second stream comprises a second CIS within the CIG.

Aspect 3: The method of any of Aspects 1 through 2, further comprising: transmitting a PDU associated with a third stream during a third subevent within a portion of the event that is shared between the third stream and at least one of the first stream or the second stream.

Aspect 4: The method of any of Aspects 1 through 3, further comprising: transmitting a PDU associated with the first stream during a third subevent within a portion of the event that is not shared with the second stream.

Aspect 5: The method of any of Aspects 1 through 4, further comprising: transmitting a PDU associated with the second stream during a third subevent within a portion of the event that is not shared with the first stream.

Aspect 6: The method of any of Aspects 1 through 5, wherein at least one of the first subevent or the second subevent is shifted in time when used for the second stream relative to when used for the first stream.

Aspect 7: The method of any of Aspects 1 through 6, wherein the portion of the event that is shared between the first stream and the second stream is based at least in part on an offset value.

Aspect 8: The method of any of Aspects 1 through 7, further comprising: determining to transmit the PDU associated with the first stream based at least in part on a flush point associated with the PDU associated with the first stream.

Aspect 9: The method of any of Aspects 1 through 8, further comprising: determining to transmit the PDU associated with the first stream based at least in part on a round robin schedule associated with at least the first stream and the second stream.

Aspect 10: The method of any of Aspects 1 through 9, wherein the first stream is associated with a first access address, and the second stream is associated with a second access address.

Aspect 11: The method of Aspect 10, wherein the first subevent is associated with the second stream, and the PDU associated with the first stream includes a third access address.

Aspect 12: The method of any of Aspects 10 through 11, wherein the second subevent is associated with the first stream, and the PDU associated with the second stream includes a third access address.

Aspect 13: The method of any of Aspects 1 through 9, wherein the first stream and the second stream are associated with a same access address.

Aspect 14: The method of any of Aspects 1 through 13, wherein the PDU associated with the second stream includes one or more bits in a header indicating that the PDU is for the second stream.

Aspect 15: The method of any of Aspects 1 through 14, wherein the PDU associated with the second stream is associated with a message integrity check (MIC) to indicate that the PDU is for the second stream.

Aspect 16: The method of any of Aspects 1 through 15, wherein the PDU associated with the second stream is associated with an inverted cyclic redundancy check (CRC) to indicate that the PDU is for the second stream.

Aspect 17: The method of any of Aspects 1 through 16, wherein the PDU associated with the second stream is associated with a time offset relative to the PDU associated with the second stream.

Aspect 18: A method of wireless communication performed by an acceptor device, comprising: activating a low power mode during one or more first subevents within an event that is shared between a first stream for the acceptor device and a second stream; and listening for a protocol data unit (PDU) associated with the first stream during one or more second subevents within the event.

Aspect 19: The method of Aspect 18, wherein the first stream comprises a first connected isochronous stream (CIS) within a connected isochronous group (CIG), and the second stream comprises a second CIS within the CIG.

Aspect 20: The method of any of Aspects 18 through 19, wherein the one or more second subevents are associated with the acceptor device and are sequential relative to the one or more first subevents.

Aspect 21: The method of any of Aspects 18 through 19, wherein the one or more second subevents are associated with the acceptor device and are interleaved with the one or more first subevents.

Aspect 22: The method of any of Aspects 18 through 21, wherein the second stream is associated with the acceptor device.

Aspect 23: The method of any of Aspects 18 through 21, wherein the second stream is associated with an additional acceptor device.

Aspect 22: An apparatus for wireless communication at a device, comprising a processor; memory coupled with the processor; and instructions stored in the memory and executable by the processor to cause the apparatus to perform the method of one or more of Aspects 1-17.

Aspect 23: A device for wireless communication, comprising a memory and one or more processors coupled to the memory, the one or more processors configured to perform the method of one or more of Aspects 1-17.

Aspect 24: An apparatus for wireless communication, comprising at least one means for performing the method of one or more of Aspects 1-17.

Aspect 25: A non-transitory computer-readable medium storing code for wireless communication, the code comprising instructions executable by a processor to perform the method of one or more of Aspects 1-17.

Aspect 26: A non-transitory computer-readable medium storing a set of instructions for wireless communication, the set of instructions comprising one or more instructions that, when executed by one or more processors of a device, cause the device to perform the method of one or more of Aspects 1-17.

Aspect 27: An apparatus for wireless communication at a device, comprising a processor; memory coupled with the processor; and instructions stored in the memory and executable by the processor to cause the apparatus to perform the method of one or more of Aspects 18-21.

Aspect 28: A device for wireless communication, comprising a memory and one or more processors coupled to the memory, the one or more processors configured to perform the method of one or more of Aspects 18-21.

Aspect 29: An apparatus for wireless communication, comprising at least one means for performing the method of one or more of Aspects 18-21.

Aspect 30: A non-transitory computer-readable medium storing code for wireless communication, the code comprising instructions executable by a processor to perform the method of one or more of Aspects 18-21.

Aspect 31: A non-transitory computer-readable medium storing a set of instructions for wireless communication, the set of instructions comprising one or more instructions that, when executed by one or more processors of a device, cause the device to perform the method of one or more of Aspects 18-21.

The foregoing disclosure provides illustration and description but is not intended to be exhaustive or to limit the aspects to the precise forms disclosed. Modifications and variations may be made in light of the above disclosure or may be acquired from practice of the aspects.

As used herein, the term "component" is intended to be broadly construed as hardware and/or a combination of hardware and software. "Software" shall be construed broadly to mean instructions, instruction sets, code, code segments, program code, programs, subprograms, software modules, applications, software applications, software packages, routines, subroutines, objects, executables, threads of execution, procedures, and/or functions, among other examples, whether referred to as software, firmware, middleware, microcode, hardware description language, or otherwise. As used herein, a "processor" is implemented in hardware and/or a combination of hardware and software. It will be apparent that systems and/or methods described herein may be implemented in different forms of hardware and/or a combination of hardware and software. The actual specialized control hardware or software code used to implement these systems and/or methods is not limiting of the aspects. Thus, the operation and behavior of the systems and/or methods are described herein without reference to specific software code, since those skilled in the art will understand that software and hardware can be designed to implement the systems and/or methods based, at least in part, on the description herein.

As used herein, "satisfying a threshold" may, depending on the context, refer to a value being greater than the threshold, greater than or equal to the threshold, less than the threshold, less than or equal to the threshold, equal to the threshold, not equal to the threshold, or the like.

Even though particular combinations of features are recited in the claims and/or disclosed in the specification, these combinations are not intended to limit the disclosure of various aspects. Many of these features may be combined in ways not specifically recited in the claims and/or disclosed in the specification. The disclosure of various aspects includes each dependent claim in combination with every other claim in the claim set. As used herein, a phrase referring to "at least one of" a list of items refers to any combination of those items, including single members. As an example, "at least one of: a, b, or c" is intended to cover a, b, c, a+b, a+c, b+c, and a+b+c, as well as any combination with multiples of the same element (e.g., a+a, a+a+a, a+a+b, a+a+c, a+b+b, a+c+c, b+b, b+b+b, b+b+c, c+c, and c+c+c, or any other ordering of a, b, and c).

No element, act, or instruction used herein should be construed as critical or essential unless explicitly described as such. Also, as used herein, the articles "a" and "an" are intended to include one or more items and may be used interchangeably with "one or more." Further, as used herein, the article "the" is intended to include one or more items referenced in connection with the article "the" and may be used interchangeably with "the one or more." Furthermore, as used herein, the terms "set" and "group" are intended to include one or more items and may be used interchangeably with "one or more." Where only one item is intended, the phrase "only one" or similar language is used. Also, as used herein, the terms "has," "have," "having," or the like are intended to be open-ended terms that do not limit an element that they modify (e.g., an element "having" A may also have B). Further, the phrase "based on" is intended to mean "based, at least in part, on" unless explicitly stated otherwise. Also, as used herein, the term "or" is intended to be inclusive when used in a series and may be used interchangeably with "and/or," unless explicitly stated otherwise (e.g., if used in combination with "either" or "only one of").

What is claimed is:

1. An apparatus for wireless communication at an initiator device, comprising:
   one or more memories; and
   one or more processors, individually or collectively coupled to the one or more memories, configured to:
      transmit a protocol data unit (PDU) associated with a first stream during a first subevent within a portion of a single event that is shared between the first stream and a second stream, wherein the portion of the single event includes the first subevent and a second subevent, and wherein the portion of the single event comprises one or more common subevents shared between the first stream and the second stream;
      transmit a PDU associated with the second stream during the second subevent within the portion of the single event that is shared between the first stream and the second stream; or
      a combination thereof.

2. The apparatus of claim 1, wherein the first stream comprises a first connected isochronous stream (CIS) within a connected isochronous group (CIG), and the second stream comprises a second CIS within the CIG.

3. The apparatus of claim 1, wherein the one or more processors are further configured to:
   transmit a PDU associated with a third stream during a third subevent within the portion of the single event that is shared between the third stream and at least one of the first stream or the second stream.

4. The apparatus of claim 1, wherein the one or more processors are further configured to:
   transmit a PDU associated with the first stream during a third subevent within a portion of the single event that is not shared with the second stream.

5. The apparatus of claim 1, wherein the one or more processors are further configured to:
   transmit a PDU associated with the second stream during a third subevent within a portion of the single event that is not shared with the first stream.

6. The apparatus of claim 1, wherein at least one of the first subevent or the second subevent of the single event is shifted in time when used for the second stream relative to when used for the first stream.

7. The apparatus of claim 1, wherein the portion of the single event that is shared between the first stream and the second stream is based at least in part on an offset value.

8. The apparatus of claim 1, wherein the one or more processors are further configured to:
   determine to transmit the PDU associated with the first stream based at least in part on a flush point associated with the PDU associated with the first stream.

9. The apparatus of claim 1, wherein the one or more processors are further configured to:
   determine to transmit the PDU associated with the first stream based at least in part on a round robin schedule associated with at least the first stream and the second stream.

10. The apparatus of claim 1, wherein the first stream is associated with a first access address, and the second stream is associated with a second access address.

11. The apparatus of claim 1, wherein the first subevent is associated with the second stream, and the PDU associated with the first stream includes a third access address.

12. The apparatus of claim 1, wherein the second subevent is associated with the first stream, and the PDU associated with the second stream includes a third access address.

13. The apparatus of claim 1, wherein the first stream and the second stream are associated with a same access address.

14. The apparatus of claim 1, wherein the PDU associated with the second stream includes one or more bits in a header indicating that the PDU is for the second stream.

15. The apparatus of claim 1, wherein the PDU associated with the second stream is associated with a message integrity check (MIC) to indicate that the PDU is for the second stream.

16. The apparatus of claim 1, wherein the PDU associated with the second stream is associated with an inverted cyclic redundancy check (CRC) to indicate that the PDU is for the second stream.

17. The apparatus of claim 1, wherein the PDU associated with the second stream is associated with a time offset relative to the PDU associated with the first stream.

18. An apparatus for wireless communication at an acceptor device, comprising:

one or more memories; and one or more processors, coupled to the one or more memories, configured to:

activate a low power mode during one or more first subevents within a portion of a single event that is shared between a first stream for the acceptor device and a second stream, wherein the portion of the single event includes the first subevent and one or more second subevents, and wherein the portion of the single event comprises one or more common subevents shared between the first stream and the second stream; and listen for a protocol data unit (PDU) associated with the first stream during the one or more second subevents within the single event.

19. The apparatus of claim 18, wherein the first stream comprises a first connected isochronous stream (CIS) within a connected isochronous group (CIG), and the second stream comprises a second CIS within the CIG.

20. The apparatus of claim 18, wherein the one or more second subevents are associated with the acceptor device and are sequential relative to the one or more first subevents.

21. The apparatus of claim 18, wherein the one or more second subevents are associated with the acceptor device and are interleaved with the one or more first subevents.

22. The apparatus of claim 18, wherein the second stream is associated with the acceptor device.

23. The apparatus of claim 18, wherein the second stream is associated with an additional acceptor device.

24. A method of wireless communication performed by an initiator device, comprising:

transmitting a protocol data unit (PDU) associated with a first stream during a first subevent within a portion of a single event that is shared between the first stream and a second stream, wherein the portion of the single event includes the first subevent and a second subevent, and wherein the portion of the single event comprises one or more common subevents shared between the first stream and the second stream;

transmitting a PDU associated with the second stream during the second subevent within the portion of the single event that is shared between the first stream and the second stream; or a combination thereof.

25. The method of claim 24, further comprising:

transmitting a PDU associated with a third stream during a third subevent within the portion of the single event that is shared between the third stream and at least one of the first stream or the second stream.

26. The method of claim 24, further comprising:

transmitting a PDU associated with the first stream during a third subevent within a portion of the single event that is not shared with the second stream.

27. The method of claim 24, further comprising:

transmitting a PDU associated with the second stream during a third subevent within a portion of the single event that is not shared with the first stream.

28. The method of claim 24, further comprising:

determining to transmit the PDU associated with the first stream based at least in part on a flush point associated with the PDU associated with the first stream.

29. The method of claim 24, further comprising:

determining to transmit the PDU associated with the first stream based at least in part on a round robin schedule associated with at least the first stream and the second stream.

30. A method of wireless communication performed by an acceptor device, comprising:

activating a low power mode during one or more first subevents within a portion of a single event that is shared between a first stream for the acceptor device and a second stream, wherein the portion of the single event includes the first subevent and one or more second subevents, and wherein the portion of the single event comprises one or more common subevents shared between the first stream and the second stream; and listening for a protocol data unit (PDU) associated with the first stream during the one or more second subevents within the single event.

* * * * *